United States Patent
Saito et al.

(10) Patent No.: US 9,084,332 B2
(45) Date of Patent: Jul. 14, 2015

(54) DISCHARGE LAMP LIGHTING DEVICE, DISCHARGE LAMP LIGHTING METHOD, AND PROJECTOR DEVICE

(71) Applicant: Seiko Epson Corporation, Tokyo (JP)

(72) Inventors: Osamu Saito, Matsumoto (JP); Yasuaki Morita, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 13/795,078

(22) Filed: Mar. 12, 2013

(65) Prior Publication Data

US 2013/0250254 A1    Sep. 26, 2013

(30) Foreign Application Priority Data

Mar. 21, 2012   (JP) .................. 2012-064501
Dec. 13, 2012   (JP) .................. 2012-272206

(51) Int. Cl.
| | |
|---|---|
| G03B 21/20 | (2006.01) |
| H05B 41/282 | (2006.01) |
| G03B 21/14 | (2006.01) |
| H05B 41/288 | (2006.01) |
| H01J 61/54 | (2006.01) |
| H05B 41/38 | (2006.01) |

(52) U.S. Cl.
CPC ............ *H05B 41/2828* (2013.01); *G03B 21/14* (2013.01); *H05B 41/2883* (2013.01); *G03B 21/2026* (2013.01); *H01J 61/54* (2013.01); *H05B 41/388* (2013.01)

(58) Field of Classification Search
CPC ............ H05B 41/388; H05B 41/2828; H05B 41/2883; H01J 61/54; H01J 65/56; Y02B 20/19

USPC ............ 353/85, 121, 122; 315/247, 246, 224, 315/225, 209, 291, 307–311; 313/318.01, 313/493, 489, 568, 573, 635, 637
See application file for complete search history.

(56) References Cited

U.S. PATENT DOCUMENTS

| | | | | |
|---|---|---|---|---|
| 5,925,990 | A  * | 7/1999 | Crouse et al. | 315/307 |
| 6,304,039 | B1 * | 10/2001 | Appelberg et al. | 315/169.3 |
| 8,207,680 | B2 * | 6/2012 | Nakada et al. | 315/291 |
| 8,400,074 | B2 * | 3/2013 | Hasegawa et al. | 315/291 |
| 2004/0160152 | A1 * | 8/2004 | Onishi et al. | 313/50 |
| 2004/0257001 | A1 | 12/2004 | Langeslag et al. | |
| 2006/0055345 | A1 | 3/2006 | Takeuchi | |
| 2007/0103649 | A1 * | 5/2007 | Takada et al. | 353/85 |
| 2010/0134766 | A1 * | 6/2010 | Takezawa | 353/85 |
| 2011/0018460 | A1 | 1/2011 | Samejima et al. | |

FOREIGN PATENT DOCUMENTS

| | | |
|---|---|---|
| JP | 2004-221031 A | 8/2004 |
| JP | 2005-507554 A | 3/2005 |

(Continued)

*Primary Examiner* — Sultan Chowdhury
(74) *Attorney, Agent, or Firm* — ALG Intellectual Property, LLC

(57) ABSTRACT

A discharge lamp lighting device includes a resonant circuit section connected to a discharge lamp, a power conversion section adapted to convert direct-current power into alternating-current power, and then supply the discharge lamp with the alternating-current power via the resonant circuit section, and a control section adapted to change a frequency of the alternating-current power in a stepwise manner with a frequency, which is different from a frequency causing a resonance of the resonant circuit section, intervening between frequency values of the frequency changed in a lighting start period until the discharge lamp reaches a stationary lighting state.

21 Claims, 13 Drawing Sheets

FOREIGN PATENT DOCUMENTS

| | | |
|---|---|---|
| JP | 2007-027145 A | 2/2007 |
| JP | 2011-029011 A | 2/2011 |
| WO | WO-03-039211 A | 5/2003 |

* cited by examiner

| CURRENT VALUE | SKIP COUNT |
|---|---|
| Id | 5 |
| Ic | 4 |
| Ib | 3 |
| ... | ... |
| Ia | 0 |
| Ix | 0 |
| Ir | 0 |

DISCHARGE LAMP LIGHTING DEVICE, DISCHARGE LAMP LIGHTING METHOD, AND PROJECTOR DEVICE

BACKGROUND

1. Technical Field

The present invention relates to a discharge lamp lighting device, a discharge lamp lighting method, and a projector device.

2. Related Art

In the past, there has been known a projector device equipped with a discharge lamp such as a high-pressure mercury lamp as a light source, and this type of projector device is provided with a resonant circuit for obtaining a high voltage for starting discharge of the discharge lamp (see JP-A-2007-27145 (Document 1)). According to this projector device, when lighting the discharge lamp, the high voltage is obtained by matching the frequency of the alternating-current power supplied to the discharge lamp with the resonant frequency of the resonant circuit. Further, after the discharge lamp starts discharge to light, the frequency of the alternating-current power supplied to the discharge lamp is lowered to thereby supply the discharge lamp with a voltage for stationary lighting.

Incidentally, individual difference and aging variation exist in the inductance component and the capacitance component of the resonant circuit. Therefore, if the frequency of the alternating-current power, which is supplied to the resonant circuit when lighting the discharge lamp, is fixed, there can occur the case in which the resonant fails to occur, and as a result, the discharge lamp fails to light. In order to avoid such a problem, according to the technology disclosed in Document 1, the frequency of the alternating-current power supplied to the discharge lamp is increased monotonically toward the resonant frequency to thereby find out the actual resonant frequency in every lighting operation (see description in, e.g., paragraphs 0076, 0081 of Document 1).

However, according to the related art described above of monotonically varying the frequency of the alternating-current power supplied to the discharge lamp, the resonant circuit is left in a quasi-resonant state until the discharge lamp starts lighting. In such a state, the voltage and the current in the resonant circuit increase, and further, the switching loss in, for example, a bridge circuit for generating the alternating-current power supplied to the resonant circuit also increases. Therefore, according to the related art described above, there arises a problem that the power consumption when lighting the discharge lamp increases.

SUMMARY

An advantage of some aspects of the invention is to provide a discharge lamp lighting device, a discharge lamp lighting method, and a projector device capable of lighting a discharge lamp while reducing the power consumption.

An aspect of the invention is directed to a discharge lamp lighting device including a resonant circuit section connected to a discharge lamp, a power conversion section adapted to convert direct-current power into alternating-current power, and then supply the discharge lamp with the alternating-current power via the resonant circuit section, and a control section adapted to change a frequency of the alternating-current power in a stepwise manner with a frequency, which is different from a frequency causing a resonance of the resonant circuit section, intervening between frequency values of the frequency changed in a lighting start period until the discharge lamp reaches a stationary lighting state.

According to the configuration described above, in the process of changing the frequency of the alternating-current power supplied to the resonant circuit section, the frequency of the alternating-current power is temporarily set to the frequency different from the frequency causing the resonance of the resonant circuit section. Thus, the resonant circuit section temporarily gets out of the resonant state, and it is arranged that the reactance component of the resonant circuit section is temporarily actualized. Therefore, the voltage and the current in the resonant circuit section are suppressed, and thus the power consumption in the resonant circuit section is suppressed. Therefore, it becomes possible to light the discharge lamp while suppressing the power consumption.

In the discharge lamp lighting device described above, for example, the control section may change the frequency of the alternating-current power in a stepwise manner in a descending direction toward the frequency causing the resonance of the resonant circuit section.

According to the configuration described above, since the resonant circuit section acts in the capacitive region in the process of changing the frequency of the alternating-current power in a stepwise manner, the current flowing back from the resonant circuit section to the power conversion section does not occur in the process of the power conversion section performing the switching operation. Therefore, it becomes possible to prevent the loss due to the reverse current.

In the discharge lamp lighting device described above, for example, the frequency different from the frequency causing the resonance of the resonant circuit section may be a frequency lower than the frequency causing the resonance of the resonant circuit section.

According to the configuration described above, since the resonant circuit section gets out of the resonant state when the frequency of the alternating-current power is set to the frequency lower than the frequency causing the resonance of the resonant circuit section, the voltage and the current in the resonant circuit section can be reduced. In addition, since the frequency of the switching operation in the power conversion section for supplying the alternating-current power is decreased, the switching loss in the power conversion section can be reduced.

The discharge lamp lighting device described above may further include, for example, a lighting detection section adapted to detect lighting of the discharge lamp, and the control section may change the frequency of the alternating-current power in a stepwise manner with the frequency, which is different from the frequency causing the resonance of the resonant circuit section, intervening between the frequency values of the frequency changed if lighting of the discharge lamp fails to be detected by the lighting detection section.

According to the configuration described above, it becomes possible to change the frequency of the alternating-current power in a stepwise manner until the lighting detection section detects lighting of the discharge lamp.

In the discharge lamp lighting device described above, for example, the control section may set the frequency of the alternating-current power to a predetermined frequency in a stationary lighting state if the lighting detection section detects lighting of the discharge lamp.

According to the configuration described above, it becomes possible to make the discharge lamp transition to the stationary lighting state.

The discharge lamp lighting device described above may further include, for example, a lighting detection section adapted to detect lighting of the discharge lamp, the control section may set the frequency of the alternating-current power in a first time period so that the frequency of the alternating-current power changes in a stepwise manner with the frequency, which is different from the frequency causing the resonance of the resonant circuit section, intervening between frequency values of the frequency changing, and the lighting detection section may detect lighting of the discharge lamp in a second time period after the first time period.

According to the configuration described above, it becomes possible to perform the stable lighting detection of the discharge lamp.

The discharge lamp lighting device described above may further include, for example, a voltage detection section adapted to detect a resonant voltage of the resonant circuit section, and if a change in the resonant voltage detected by the voltage detection section is switched from increase to decrease in a process of changing the frequency of the alternating-current power in a stepwise manner, the control section may set the frequency of the alternating-current power to the frequency in a previous step.

According to the configuration described above, it becomes possible to set the frequency of the alternating-current power to the vicinity of the frequency causing the resonance of the resonant circuit section.

The discharge lamp lighting device described above may further include, for example, a current detection section adapted to detect a resonant current of the resonant circuit section, and if a change in the resonant current detected by the current detection section is switched from increase to decrease in a process of changing the frequency of the alternating-current power in a stepwise manner, the control section may set the frequency of the alternating-current power to the frequency in a previous step.

According to the configuration described above, it becomes possible to set the frequency of the alternating-current power to the vicinity of the frequency causing the resonance of the resonant circuit section.

The discharge lamp lighting device described above may further include, for example, a detection section adapted to detect one of a resonant output current and a resonant output voltage of the resonant circuit section, and a lighting detection section adapted to detect lighting of the discharge lamp, and if a change in one of the resonant current and the resonant voltage detected by the detection section is switched from increase to decrease in a first time period in a process of changing the frequency of the alternating-current power in a stepwise manner, the control section may set the frequency of the alternating-current power to the frequency in a previous step, and the lighting detection section may detect lighting of the discharge lamp in a second time period after the first time period.

According to the configuration described above, it becomes possible to apply alternating-current power with a higher voltage to the discharge lamp.

In the discharge lamp lighting device described above, in the first time period, the control section may apply the frequency in the previous step set as the frequency of the alternating-current power a predetermined number of times before the first time period ends.

According to the configuration described above, it becomes possible to apply alternating-current power with a higher voltage to the discharge lamp.

In the discharge lamp lighting device described above, for example, alternating-current power with a frequency 1/N (N denotes an integer) of the frequency of the alternating-current power may be applied to the resonant circuit section.

According to the configuration described above, for example, the greater the value of N is, the higher the natural resonant frequency of the resonant circuit section becomes. The higher the natural resonant frequency of the resonant circuit section is, the smaller the values of the inductance component and the capacitance component defining the resonant frequency can be set. Therefore, by using the alternating-current power with the 1/N frequency, it becomes possible to configure the resonant circuit section having a small size. Further, by using the alternating-current power with the 1/N frequency, the frequency of the alternating-current power supplied to the resonant circuit section can be set lower relatively to the natural resonant frequency of the resonant circuit section. Therefore, it becomes possible to stabilize the switching operation of the power conversion section for supplying the alternating-current power described above.

Another aspect of the invention is directed to a discharge lamp lighting device adapted to supply a discharge lamp with alternating-current power via a resonant circuit section to thereby start discharge of the discharge lamp to light the discharge lamp including a section adapted to change a frequency of the alternating-current power in a stepwise manner with a frequency, which is different from a frequency causing a resonance of the resonant circuit section, intervening between frequency values of the frequency changed in a lighting start period until the discharge lamp reaches a stationary lighting state.

According to the configuration described above, substantially the same functions and advantages as in the discharge lamp lighting device according to the aspect of the invention described above can be obtained.

In the discharge lamp lighting device described above, for example, the frequency different from the frequency causing a resonance of the resonant circuit section may be lower than the frequency causing the resonance of the resonant circuit section, and higher than a frequency at which a current supplied from a power conversion section adapted to supply the alternating-current power is one of equal to and lower than a predetermined value.

According to the configuration described above, it becomes possible to suppress the power consumption in the resonant circuit section while suppressing the rush current supplied to the discharge lamp.

Still another aspect of the invention is directed to a discharge lamp lighting method including converting, by a power conversion section, direct-current power into alternating-current power, and then supplying a discharge lamp with the alternating-current power via a resonant circuit section, and changing, by a control section, a frequency of the alternating-current power in a stepwise manner with a frequency, which is different from a frequency causing a resonance of the resonant circuit section, intervening between frequency values of the frequency changed in a lighting start period until the discharge lamp reaches a stationary lighting state.

According to the configuration described above, substantially the same functions and advantages as in the discharge lamp lighting device according to the aspect of the invention described above can be obtained.

Yet another aspect of the invention is directed to a projector device including a discharge lamp as a light source, and any one of the discharge lamp lighting devices described above as a device adapted to light the discharge lamp.

According to the configuration described above, substantially the same functions and advantages as in the discharge lamp lighting device according to the aspect of the invention described above can be obtained.

According to the aspects of the invention, it is possible to light the discharge lamp while suppressing the power consumption.

BRIEF DESCRIPTION OF THE DRAWINGS

The invention will be described with reference to the accompanying drawings, wherein like numbers reference like elements.

FIG. 10 is a table showing an example of a relationship between a current value and a skip count according to the embodiment.

DESCRIPTION OF EXEMPLARY EMBODIMENTS

First Embodiment

Hereinafter, a first embodiment out of some aspects of embodying the invention will be explained in detail with reference to the accompanying drawings.

It should be noted that the same reference symbols will denote the same elements throughout all of the embodiment and all of the drawings in the present specification.

Figure 1:
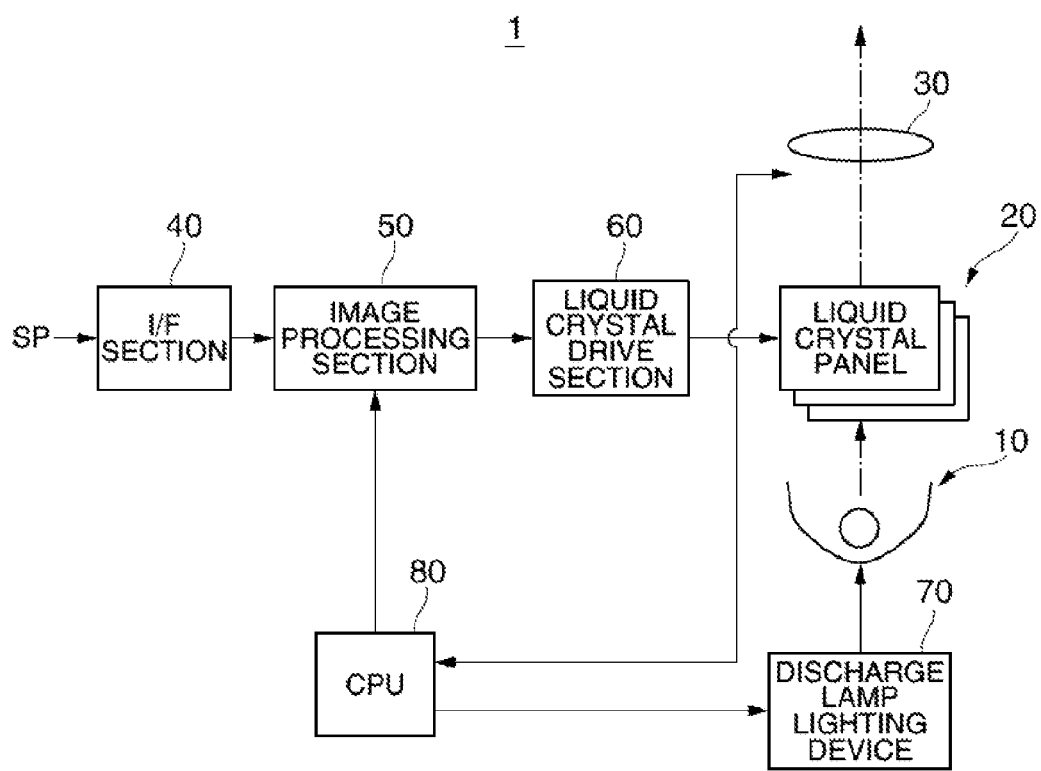
FIG. 1 is a block diagram showing an example of a functional configuration of a projector device according to a first embodiment of the invention.

FIG. 1 is a block diagram showing an example of a functional configuration of a projector device 1 according to the present embodiment. The projector device 1 according to the present embodiment is provided with a discharge lamp 10 as a light source, liquid crystal panels 20 for modulating and then transmitting illumination light from the discharge lamp 10 in accordance with an image to be projected, and a projection optical system 30 for projecting the transmitted light, which is transmitted through the liquid crystal panels 20, on a screen (not shown). Although in the present embodiment, it is assumed that the high-pressure mercury lamp using the arc discharge is used as the discharge lamp 10, the invention is not limited to this example, but an arbitrary discharge lamp such as a metal halide lamp or a xenon lamp can be used.

Further, the projector device 1 is provided with an interface (I/F) section 40, an image processing section 50, a liquid crystal drive section 60, a discharge lamp lighting device 70, and a central processing unit (CPU) 80. Among these constituents, the interface section 40 is for converting an image signal SP input from a personal computer or the like not shown into image data having a format, which can be processed by the image processing section 50. The image processing section 50 is for performing a variety of image processing such as a luminance adjustment or a balance adjustment on the image data supplied from the interface section 40. The liquid crystal panel drive section 60 is for driving the liquid crystal panels 20 based on the image data on which the image processing is performed by the image processing section 50.

The discharge lamp lighting device 70 is provided with a resonant circuit section 73 described later functioning as an igniter, and supplies the discharge lamp 10 with the high-frequency alternating-current power via the resonant circuit section 73 to thereby start discharge of the discharge lamp to light the discharge lamp 10. The discharge lamp lighting device 70 is configured so as to change the frequency fs of the alternating-current power supplied from a power conversion section 72 in a stepwise manner with a predetermined basic frequency fo, which is different from the frequency causing the resonance of the resonant circuit section 73, intervening therebetween in the lighting start period until the discharge lamp 10 reaches the stationary lighting state. The details will be described later.

The CPU 80 is for controlling the image processing section 50 and the projection optical system 30 in accordance with the operation of the operation button (not shown) provided to the remote controller not shown and the main body of the projector device 1. In the present embodiment, the CPU 80 has a function of instructing the discharge lamp lighting device 70 to light the discharge lamp 10 when, for example, the user operates the power switch (not shown) of the projector device 1.

Figure 2:
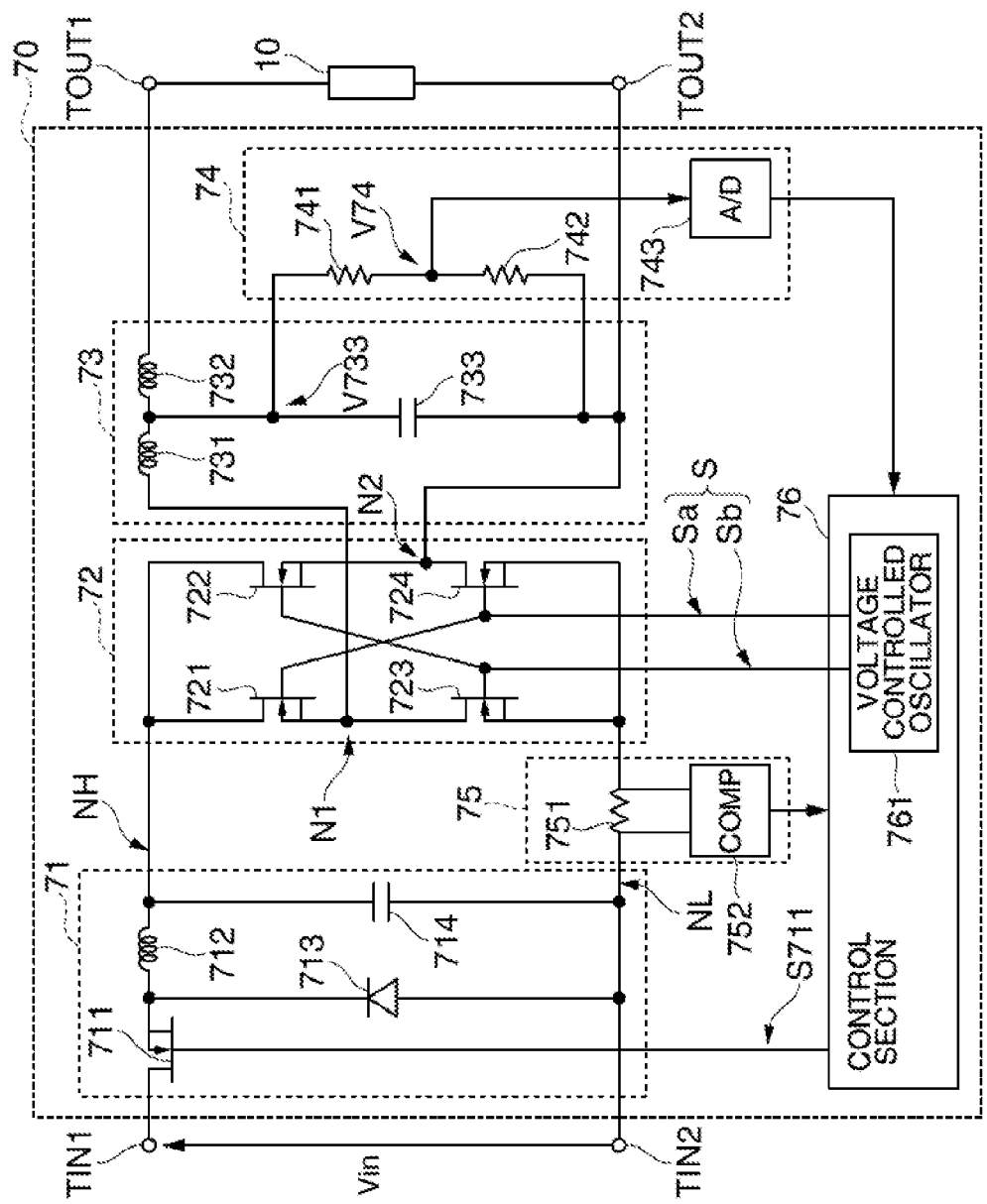
FIG. 2 is a block diagram showing an example of a functional configuration of a discharge lamp lighting device provided to the projector device according to the embodiment.

FIG. 2 shows an example of the functional configuration of the discharge lamp lighting device 70. The discharge lamp lighting device 70 is configured including a down chopper section 71, the power conversion section 72, the resonant circuit section 73, a voltage detection section 74, a lighting detection section 75, and a control section 76. Among these constituents, the down chopper section 71 is for converting the direct-current power, which is applied between an input terminal TIN1 and an input terminal TIN2 from a direct-current power supply not shown, and has a voltage Vin, into the direct-current power having a predetermined direct-current voltage, and is composed of an n-channel field effect transistor 711, a choke coil 712, a diode 713, and a capacitor 714. According to the down chopper section 71, by chopping the current flowing through the n-channel field effect transistor 711 based on a control signal S711 supplied from the control section 76, direct-current power having a desired output voltage corresponding to the duty ratio of the control signal S711 is obtained. In the present embodiment, the output voltage of the down chopper section 71 is, for example, 380V, but the invention is not limited to this voltage value.

It should be noted that the down chopper section 71 is not necessarily an essential constituent of the projector device 1 according to the present embodiment, and can therefore be eliminated.

The power conversion section 72 is for converting the direct-current power supplied from the down chopper section 71 into alternating-current power, and supplying the alternating-current power to the discharge lamp 10 via the resonant circuit section 73 described later, and is composed of n-channel field effect transistors 721 through 724 forming a full-bridge circuit. Here, the respective drains of the n-channel field effect transistors 721, 722 are connected to a high potential node NH connected to the input terminal TIN1 via the n-channel field effect transistor 711 and the choke coil 712, which constitute the down chopper section 71. The respective sources of the n-channel field effect transistors 721, 722 are connected to the respective drains of the n-channel field effect transistors 723, 724. The respective sources of the n-channel field effect transistors 723, 724 are connected to a low potential node NL connected to the input terminal TIN2 via a resistor 751 constituting the lighting detection section 75 described later.

The gate of the n-channel field effect transistor 721 and the gate of the n-channel field effect transistor 724 are supplied with a control signal Sa from the control section 76, and the gate of the n-channel field effect transistor 722 and the gate of the n-channel field effect transistor 723 are supplied with a control signal Sb, which corresponds to an inversion signal of the control signal Sa described above, from the control section 76. In the present embodiment, a connection section between the source of the n-channel field effect transistor 721 and the drain of the n-channel field effect transistor 723 is defined as one output node N1 of the power conversion section 72, and a connection section between the source of the n-channel field effect transistor 722 and the drain of the n-channel field effect transistor 724 is defined as the other output node N2 of the power conversion section 72. It is arranged that by the pair of n-channel field effect transistors 722, 723 and the pair of n-channel field effect transistors 721, 724 performing switching in a complementary manner based on the control signals S (Sa, Sb) supplied from the control section 76, the voltages of 380V and 0V are output from the output nodes N1, N2 in a complementary manner. In other words, due to the switching operation of these n-channel field effect transistors 721 through 724, the power conversion section 72 converts the direct-current power into the alternating-current power. The alternating-current power is a rectangular wave, and has a basic frequency fs. The frequency fs of the alternating-current power coincides with a clock frequency of the control signals S supplied from the control section 76 described later. In the present embodiment, the explanation will be presented assuming that the frequency of the control signals S supplied from the control section 76 and the frequency of the alternating-current power supplied from the power conversion section 72 are both the "frequency fs."

The resonant circuit section 73 functions as the igniter for generating a high voltage exceeding the discharge starting voltage (the breakdown voltage) of the discharge lamp 10, and is composed of two coils 731, 732 magnetically coupled to each other, and a capacitor 733. Further, the discharge lamp 10 is connected to the resonant circuit section 73 via the output terminals TOUT1, TOUT2. Here, one end of the coil 731 is connected to the output node N1 of the power conversion section 72, the other end of the coil 731 is connected to one end of the coil 732, and the other end of the coil 732 is connected to the output terminal TOUT1. One electrode of the capacitor 733 is connected to a connection node between the coil 731 and the coil 732, and the other electrode of the capacitor 733 is connected to the output node N2 of the power conversion section 72, and at the same time to the output terminal TOUT2.

In the present embodiment, an LC series resonant circuit is formed of the coil 731 and the capacitor 733 constituting the resonant circuit section 73, and basically, the resonant frequency (the resonant frequency determined by the coil 731 and the capacitor 733) of the LC series resonant circuit appears as the natural resonant frequency fr of the resonant circuit section 73. In the present embodiment, the resonant frequency fr is set to, for example, 390 kHz. Therefore, if the frequency fs of the alternating-current power supplied from the power conversion section 72 coincides with the resonant frequency fr of the resonant circuit section 73 to thereby set the LC series resonant circuit composed of the coil 731 and the capacitor 733 to the resonant state, the inter-terminal voltage V733 of the capacitor 733 becomes infinity in principle, and thus the high voltage necessary to start discharge of the discharge lamp 10 can be obtained using the resonant circuit section 73. It should be noted that since a third-order resonance mode is used in the present embodiment as described later, the frequency fs of the alternating-current power supplied from the power conversion section 72 when the resonant circuit section 73 gets into the resonant state is the frequency a third as high as the natural resonant frequency fr of the resonant circuit section 73. In other words, if an N-order resonant mode is used, the frequency fs of the alternating-current power supplied from the power conversion section 72 when the resonant circuit section 73 gets into the resonant state becomes the frequency an Nth as high as the natural frequency fr of the resonant circuit section 73.

However, even if the LC resonant circuit described above gets into the resonant state, if the resistance component of the n-channel field effect transistors 721 through 724 constituting the power conversion section 72 or the wiring impedance exists, the inter-terminal voltage V733 of the capacitor 733 fails to exceed the level of about 1 through 1.5 kV, and it becomes unachievable to obtain the high voltage necessary to start discharge of the discharge lamp 10. Therefore, in the present embodiment, the resonant circuit section 73 is provided with the coil 732 magnetically connected to the coil 731 constituting the LC series resonant circuit, and amplifies the inter-terminal voltage V733 of the capacitor 733 in accordance with the turn ratio between the coil 731 and the coil 732 to thereby finally generate the high voltage of several kV necessary to start discharge of the discharge lamp 10.

Further, in the present embodiment, the resonant circuit section 73 uses a so-called third-order resonance mode to thereby resonate at the frequency three times as high as the frequency fs of the alternating-current power supplied from the power conversion section 72 in the lighting start period. Here, the third-order resonance mode uses the vibrational component of the waveform of the alternating-current power output from the power conversion section 72. In principle, the power conversion section 72 outputs a rectangular wave as the waveform of the alternating-current power, and the waveform includes a harmonic component. Using the harmonic component, the resonant circuit section 73 is designed to resonate at a frequency three times as high as the frequency fs of the alternating-current power output from the power conversion section 72 in the lighting start period. In other words, the resonant frequency fr of the resonant circuit section 73 is set to the frequency three times as high as the frequency fs of the alternating-current power output from the power conversion section 72 in the lighting start period. In the present embodiment, the resonant frequency fr of the resonant circuit section 73 is set to 390 kHz, and when the alternating-current power at 130 kHz is supplied from the power conversion section 72, the resonant circuit section 73 resonates at 390 kHz three times as high as the frequency due to the third-order resonance mode. As described above, by using the third-order resonance mode, the resonant frequency fr of the resonant circuit section 73 can be set to be relatively higher than the frequency fs of the alternating-current power described above. Therefore, it becomes possible to set each of the values of the inductance components of the coils 731, 732 and the capacitance component of the capacitor 733 constituting the resonant circuit section 73 to be smaller as compared with the case not using the third-order resonance mode, and thus configure the resonant circuit section 73 to be compact. Further, among the coils 731, 732 constituting the resonant circuit section 73, the coil 732 can be eliminated. In the case in which, for example, the voltage for lighting the discharge lamp 10 is low, or the influence of each of the elements and patterns is small and the inter-terminal voltage V733 is high, the coil 732 becomes unnecessary, and thus, the resonant circuit section 73 can be configured compact.

Therefore, the resonant circuit section 73 can be configured more compact by matching the resonant frequency fr of the resonant circuit section 73 with the frequency (390 kHz) three times as high as the frequency fs of the alternating-current power output from the power conversion section 72 in the lighting start period using the third-order resonance mode compared to the case of matching the resonant frequency fr of the resonant circuit section 73 with the frequency fs (130 kHz) of the alternating-current power described above. Further, by using the third-order resonance mode, the frequency fs of the alternating-current power output by the power conversion section 72 can be set to a relatively low level even if the resonant frequency fr of the resonant circuit section 73 is set to a high level. Therefore, the switching operation in the high voltage region by the power conversion section 72 can be stabilized, and it becomes possible to reduce the load of the power conversion section 72.

The frequency fs of the alternating-current power described above in the case of causing the resonance of the resonant circuit section 73 in such a third-order resonance mode has an equivalent technical sense to the natural resonant frequency fr of the resonant circuit section 73 in terms of bringing the resonant circuit section 73 into the resonant state, and can apparently be treated as the resonant frequency of the resonant circuit section 73. Therefore, the frequency fs of the alternating-current power of the power conversion section 72 for causing the resonance of the resonant circuit section 73 in the third-order resonance mode is hereinafter referred to as a "resonant frequency fsr of the resonant circuit section 73," or simply as a "resonant frequency fsr." The resonant frequency fsr is stored in, for example, a storage section not shown provided to the control section 76.

It should be noted that in the present embodiment, the third-order resonance mode is not necessarily an essential element, and if the third-order resonance mode is not used (i.e., in the case of using the first-order resonance mode), the resonant frequency fsr coincides with the natural resonant frequency fr of the resonant circuit section 73. Further, although in the present embodiment, the case in which the resonant circuit section 73 resonates in the third-order resonance mode is cited as an example, the third-order resonance mode is not a limitation, and it is also possible to assume that the resonant circuit section 73 resonates using an N-order resonance mode (N denotes an odd number). In this case, the resonant frequency fsr is defined as the frequency at which the resonance of the resonant circuit section 73 is caused in the arbitrary N-order resonance mode including the natural resonant frequency fr of the resonant circuit section 73, and the frequency of the alternating-current power supplied from the power conversion section 72 or the frequency of the control signals S.

The voltage detection section 74 is for detecting the inter-terminal voltage V733 of the capacitor 733 constituting the resonant circuit section 73 described above, and is composed of resistors 741, 742 connected in series between the terminals of the capacitor 733, and an analog/digital (A/D) conversion section 743. Here, the resistors 741, 742 are for dividing the inter-terminal voltage V733 of the capacitor 733 of the resonant circuit section 73 to obtain a voltage V74 corresponding to the resistor ratio thereof. In the present embodiment, the inter-terminal voltage V733 of the capacitor 733 is referred to as a "resonant output voltage V733." The analog/digital conversion section 743 is for converting the voltage V74 thus divided into digital data and then outputting the digital data. In the present embodiment, the voltage V74 is a voltage of an intermediate stage generated for matching the resonant output voltage V733 with the input characteristic of the analog/digital conversion section 743. Therefore, the digital data output by the analog/digital conversion section 743 represents the value of the resonant output voltage V733, and the resonant output voltage V733 detected by the voltage detection section 74 is supplied to the control section 76.

The lighting detection section 75 is for detecting lighting/failure-in-lighting of the discharge lamp 10, and is composed of the resistor 751 and a comparator section 752. Here, the resistor 751 is connected between the input terminal TIN2 and the sources of the respective n-channel field effect transistors 723, 724 constituting the power conversion section 72, and the inter-terminal voltage (a drop voltage) of the resistor 751 is input to the comparator section 752. The comparator section 752 detects the current flowing through the discharge lamp 10 based on the inter-terminal voltage of the resistor 751, and by comparing the current thus detected and a predetermined voltage value (not shown) corresponding to the current, which flows through the resistor 751 when the discharge lamp 10 starts lighting, with each other, lighting/failure-in-lighting of the discharge lamp 10 is detected. Specifically, the lighting detection section 75 detects lighting of the discharge lamp 10 if, for example, the inter-terminal voltage of the resistor 751 is equal to or higher than a predetermined voltage value, and detects failure-in-lighting of the discharge lamp 10 if the inter-terminal voltage of the resistor 751 falls below the predetermined voltage value. When detecting lighting of the discharge lamp, the lighting detection section 75 outputs a signal representing the detection of lighting of the discharge lamp to the control section 76.

The control section 76 is for controlling the switching operation of each of the down chopper section 71 and the power conversion section 72 described above, and in the present embodiment, the control section 76 controls the switching operation of the power conversion section 72 so as to change the frequency fs of the alternating-current power supplied from the power conversion section 72 to the resonant circuit section 73 in a stepwise manner with a basic frequency fo, which is different from the resonant frequency fsr of the resonant circuit section 73, intervening therebetween in the lighting start period until the discharge lamp 10 reaches the stationary lighting state.

Here, the basic frequency fo is a frequency lower than the resonant frequency fsr of the resonant circuit section 73, and is not equal to zero. In the present embodiment, it is assumed that the basic frequency fo is 50 kHz. The lower limit value of the basic frequency fo is set to the frequency at which a rush current from the power conversion section 72 toward the lamp via the resonant circuit section 73 is not formed when the frequency fs of the alternating-current power supplied from the power conversion section 72 is dropped. Further, the upper limit value of the basic frequency fo is set to a level lower than the resonant frequency fsr of the resonant circuit section 73, but is preferably set to the frequency at which the resonant circuit section 73 does not reach the resonant state (the state in which the resonant output voltage V733 increases). The basic frequency fo can arbitrarily be set within a range defined by the lower limit value and the upper limit value described above.

The control section 76 is provided with a voltage controlled oscillator 761. The voltage controlled oscillator is for outputting the signal with the frequency corresponding to the input voltage (not shown) as a control signal S. The signal defining the input voltage of the voltage controlled oscillator 761 is generated in the control section 76 so that the switching operation described later of the power conversion section 72 can be obtained.

Then, the operation of the projector device 1 according to the present embodiment will be explained focusing attention on the discharge lamp lighting device 70.

Figure 3:
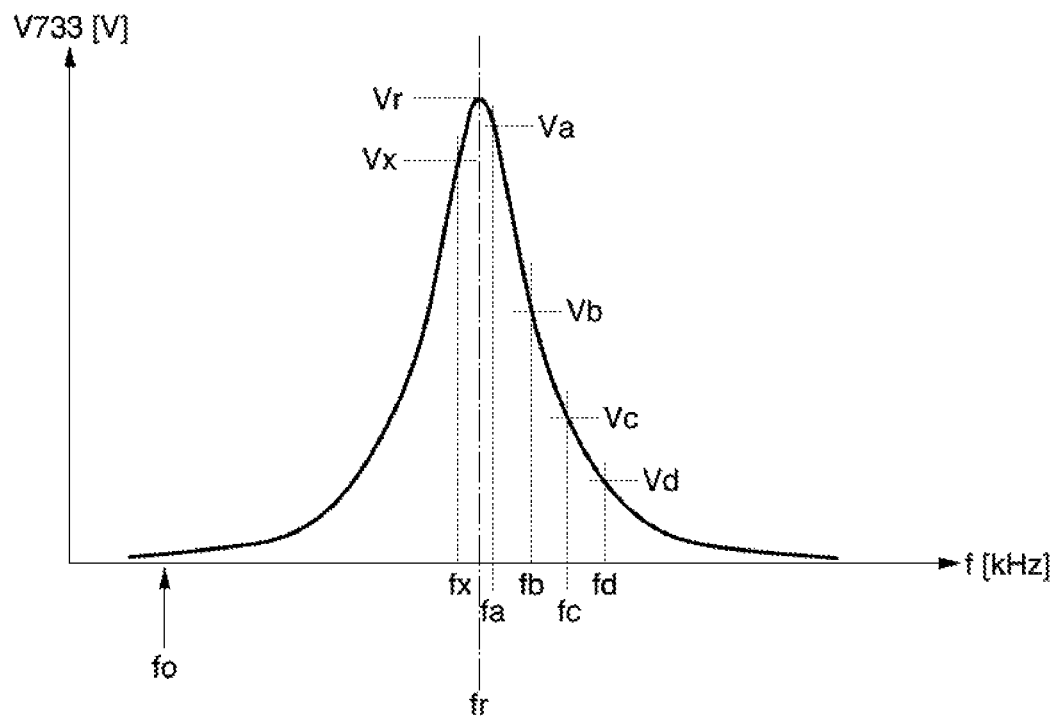
FIG. 3 is an explanatory diagram for explaining an overall operation of the discharge lamp lighting device provided to the projector device according to the embodiment.

FIG. 3 is an explanatory diagram for explaining an overall operation of the discharge lamp lighting device 70 according to the present embodiment, and shows frequency dependency (resonant characteristics) of the resonant output voltage V733 of the resonant circuit section 73. As shown in this example, the resonant output voltage V733 in the resonant circuit section 73 shows the maximum value Vr when the frequency f of the harmonic wave included in the alternating-current power supplied to the resonant circuit section 73 in the third-order resonance mode coincides with the resonant frequency fr (390 KHz) of the resonant circuit section 73. Therefore, by setting the frequency fs of the alternating-current power of the power conversion section 72 to the frequency at which the resonant output voltage V733 shows the maximum value Vr, the high voltage necessary to start the discharge of the discharge lamp 10 can be obtained even if the resonant frequency varies.

Therefore, in the present embodiment, the control section 76 sets a predetermined frequency fd sufficiently higher than the resonant frequency fsr of the resonant circuit section 73 to a starting point, and changes the frequency fs of the alternating-current power supplied from the power conversion section 72 in a descending direction from the frequency fd toward the resonant frequency fsr in the order of frequencies fc, fb, fa, and fx in a stepwise manner with the predetermined basic frequency fo, which is different from the resonant frequency fsr of the resonant circuit section 73, intervening therebetween. Then, the control section 76 identifies the resonant frequency fsr or a frequency adjacent thereto based on the resonant output voltage V733 corresponding to each of the frequencies except the basic frequency fo. In the present embodiment, since the third-order resonance mode is used, the frequency a third of the natural resonant frequency fr of the resonant circuit section 73 is identified as the resonant frequency fsr.

In the present embodiment, the frequencies fa, fb, fc, fd, and fx except the basic frequency fo are referred to as "drive frequencies," and are distinguished from the basic frequency fo. The basic frequency fo and the drive frequencies fa, fb, fc, fd, and fx each represent the frequency fs of the alternating-current power supplied from the power conversion section 72, and the frequency fs of the alternating-current power coincides with the frequency of the control signal S supplied from the control section 76. Therefore, the basic frequency fo and the drive frequencies fx, fa, fb, fc, and fd each denote the frequency of the control signal S generated in the control section 76, and the frequency fs of the alternating-current power supplied from the power conversion section 72 is set by the control section 76 to either of the basic frequency fo and the drive frequencies fa, fb, fc, fd, and fx. It should be noted that the invention is not limited to this example, but the number of drive frequencies can arbitrarily be increased.

Further, the drive frequencies fa, fb, fc, fd, and fx are generated with intervals of a constant frequency step. In other words, the control section 76 changes (decreases) the frequency fs of the alternating-current power supplied from the power conversion section 72 in a stepwise manner from the frequency fd toward the resonant frequency fsr with the constant frequency steps. It should be noted that the invention is not limited to this example, but the frequency steps can be set smaller in the vicinity of the resonant frequency fsr, for example.

Further, the drive frequency fd first set as the frequency fs in the process of changing the frequency fs of the alternating-current power in a stepwise manner is the frequency sufficiently higher than the resonant frequency fsr as described above, and is preferably set to a value exceeding the variation range of the resonant frequency fsr. Thus, it becomes possible to detect the peak value Vr of the resonant output voltage V733 in the process of changing the frequency fs of the alternating-current power supplied from the power conversion section 72 in a stepwise manner as described later even if the apparent resonant frequency fsr varies due to the variation in the natural resonant frequency fr of the resonant circuit section 73.

Figure 4:
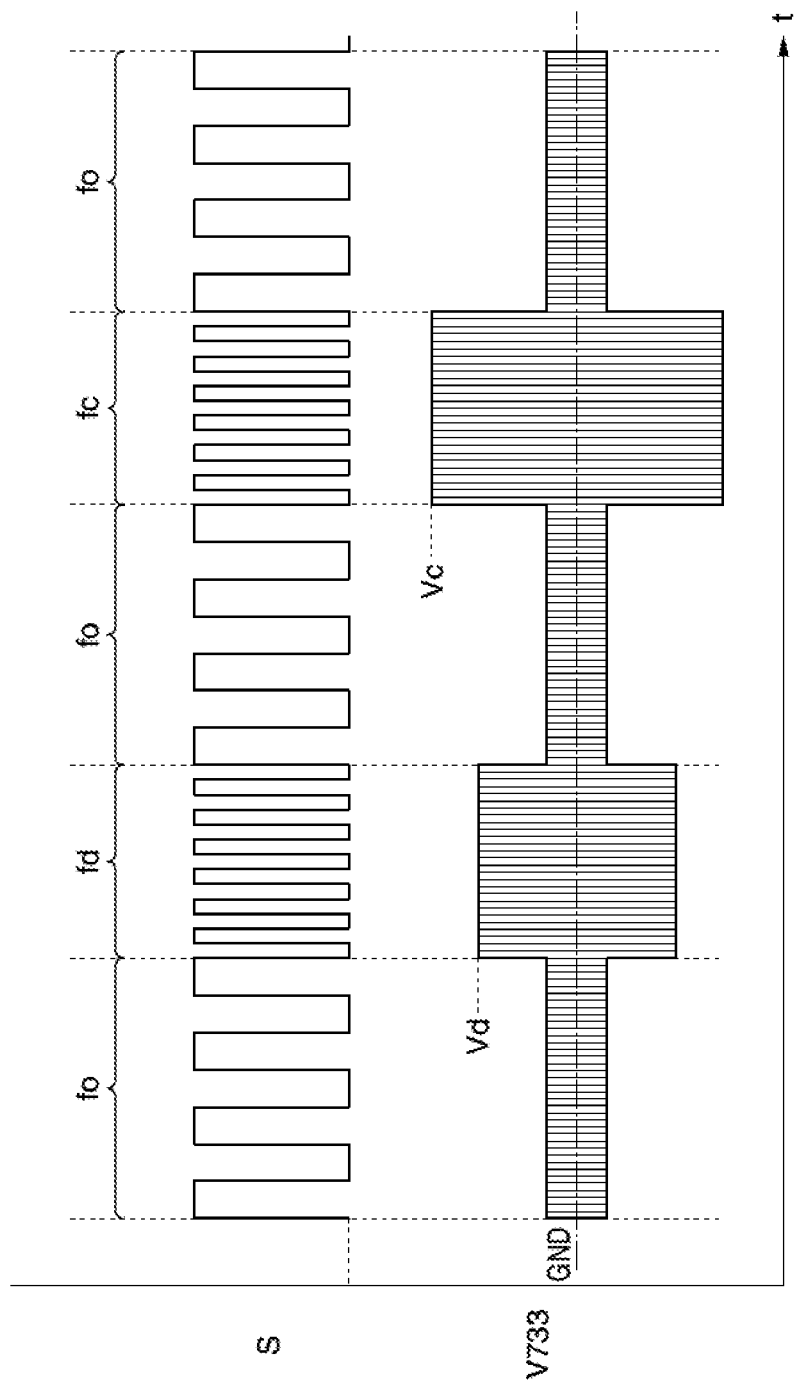
FIG. 4 is a waveform chart for supplementarily explaining an overall operation of the discharge lamp lighting device provided to the projector device according to the embodiment.

FIG. 4 is a waveform chart for supplementarily explaining the operation of the discharge lamp lighting device 70 according to the present embodiment, and schematically shows a correspondence relationship between the control signal S (the waveform shown in the upper part of the drawing) for providing the frequency fs of the alternating-current power and the waveform (the waveform shown in the lower part of the drawing) of the resonant output voltage V733 in the resonant circuit section 73.

As shown in the upper part of FIG. 4, the control signal S alternately includes the basic frequency fo described above and the drive frequencies (fc, fd) decreasing in a stepwise manner. In this example, the frequency fs of the control signal S is first set to the basic frequency fo, then set to the drive frequency fd, then set to the basic frequency fo again, and then set to the drive frequency fc. Further, as shown in the lower part of the drawing, the amplitude of the resonant output voltage V733 corresponding to the basic frequency fo of the control signal S is decreased, and the amplitude of the resonant output voltage V733 corresponding to the drive frequencies (fc, fd) decreasing in a stepwise manner is increased. The amplitude values Vc, Vd of the resonant output voltage V733 on this occasion correspond to the voltages Vc, Vd at the respective drive frequencies fc, fd shown in FIG. 3 described above.

As described above, in the process of decreasing the frequency fs of the alternating-current power in a stepwise manner, if lighting of the discharge lamp 10 is not detected by the lighting detection section 75, the control section 76 decreases the frequency fs of the alternating-current power in a stepwise manner with the basic frequency fo, which is different from the resonant frequency fsr of the resonant circuit section 73, intervening therebetween to thereby decrease the frequency fs of the alternating-current power until the lighting detection section 75 detects lighting. Then, if the lighting detection section 75 detects lighting of the discharge lamp 10, the control section 76 sets the frequency fs of the alternating-current power to the predetermined frequency of the stationary lighting state. Specifically, after the discharge of the discharge lamp 10 starts, the frequency fs of the alternating-current power is decreased to the predetermined frequency of the stationary lighting state, and lighting (the discharge) of the discharge lamp 10 is maintained.

Further, in the process of decreasing the frequency fs of the alternating-current power in a stepwise manner described above, if the frequency fs of the alternating-current power falls below the resonant frequency fsr while the discharge lamp 10 fails to light, and the resonant output voltage V733 detected by the voltage detection section 74 exceeds the peak voltage Vr shown in FIG. 3, and the change in the resonant output voltage V733 is switched from increase to decrease, the control section 76 resets the frequency fs of the alternating-current power to the drive frequency to which the frequency fs is set in the previous stage. Thus, it is possible to set the frequency fs of the alternating-current power to the drive frequency adjacent to the frequency at which the resonant output voltage V733 becomes the highest, namely the resonant frequency fsr having the highest possibility of starting the discharge in the process of decreasing the frequency fs of the alternating-current power in a stepwise manner, and the control section 76 waits for the start of the discharge of the discharge lamp 10 in this setting state. It should be noted that if the discharge lamp 10 does not start the discharge even if specified time has elapsed, an error is output to a system control section of the projector device 1 as described later.

As described above, by decreasing the frequency fs of the alternating-current power toward the resonant frequency fsr in a stepwise manner with the predetermined basic frequency fo, which is lower than the resonant frequency fsr of the resonant circuit section 73, intervening therebetween in the lighting process instead of continuously changing the frequency fs of the alternating-current power supplied to the resonant circuit section 73, the resonant circuit section 73 is prevented from being continuously left in the quasi-resonant state or the resonant state. Thus, since the reactance component of the resonant circuit section 73 is temporarily actualized in the section corresponding to the basic frequency fo, the voltage and the current in the resonant circuit section 73 are suppressed, and the power consumption in the resonant circuit section 73 is reduced. In addition, since the basic frequency fo included in the control signal S is a frequency lower than the resonant frequency fsr of the resonant circuit section 73, the frequency of the switching operation in the power conversion section 72 for supplying the alternating-current power is decreased. Therefore, it is possible to reduce the power consumption due to the switching operation in the power conversion section 72. Therefore, it becomes possible to light the discharge lamp 10 while suppressing the power consumption in the lighting process. Further, since the frequency of the switching operation in the power conversion section 72 is decreased, it is also possible to stabilize the switching operation in the high voltage region of the power conversion section 72.

Further, in the present embodiment, since the resonant circuit section 73 operates in a capacitive region in the process of changing the frequency fs of the alternating-current power in a stepwise manner, the current reversely flowing from the resonant circuit section 73 to the power conversion section 72 in the case in which the power conversion section 72 operates in the conductive region is prevented. Therefore, it becomes possible to prevent the loss due to the reverse current.

Then, based on the operation of the discharge lamp lighting device 70 described above, the operation of the projector device 1 according to the present embodiment will be explained.

Figure 5:
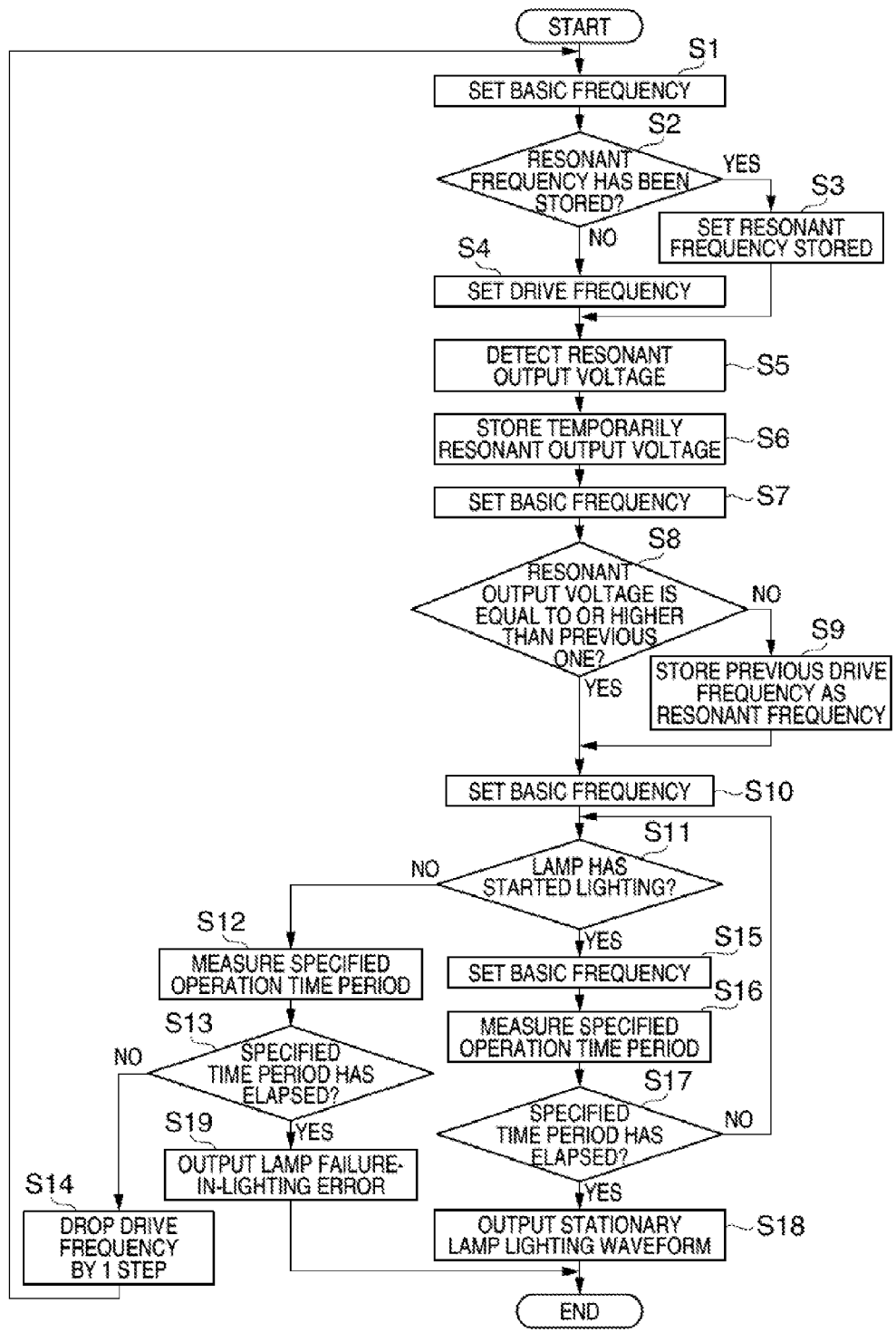
FIG. 5 is a flowchart showing an example of a flow of the operation of the projector device according to the embodiment.

FIG. 5 is a flowchart showing an example of a flow of the operation of the projector device according to the present embodiment.

Firstly, if an operation of a power switch (not shown) is performed by the user, the system control section (not shown) formed of the CPU 80 of the projector device 1 instructs the discharge lamp lighting device 70 to light the discharge lamp 10.

When receiving the instruction from the system control section described above, the control section 76 of the discharge lamp lighting device 70 starts the switching operation of the down chopper section 71 with the control signal S711, and at the same time, sets (step S1) the basic frequency fo described above as the frequency fs of the control signal S, and then starts the switching operation of the power conversion section 72 with the control signal S.

Subsequently, the control section 76 determines (step S2) whether or not the resonant frequency fsr (the frequency fs of the alternating-current power applied to the resonant circuit section 73 corresponding to the resonant frequency fr, namely the frequency of the signal S) described above is stored in a storage section not shown provided to the control section 76. Here, in the present embodiment, if the lighting operation has ever been performed in the past, the drive frequency at which the discharge of the discharge lamp 10 has started is stored in the storage section as the resonant frequency fsr due to the step S9 described later in the past lighting operation. If the resonant frequency fsr is stored in the storage section (YES in the step S2), the control section 76 sets (step S3) the drive frequency in accordance with the resonant frequency fsr thus stored. Here, it is assumed that the lighting operation has not ever been performed in the past, and the resonant frequency fsr of the past lighting operation is not stored in the storage section not shown provided to the control section 76 (NO in the step S2).

If the resonant frequency fsr of the past lighting operation is not stored in the storage section (NO in the step S2), the control section 76 sets (step S4) the predetermined drive frequency fd as the frequency fs of the control signal S. It should be noted that if the resonant frequency fsr is stored in the storage section, the drive frequency is set in accordance with the resonant frequency fsr in the step S3, and if the drive frequency is, for example, the frequency fd, the flow of the operation on and after the step S5 described later will be performed. The power conversion section 72 performs the switching operation based on the control signal S having the drive frequency fd, and supplies the resonant circuit section 73 with the alternating-current power having the drive frequency fd. In the section corresponding to the control signal S with the drive frequency fd, the voltage detection section 74 detects (step S5) the resonant output voltage V733. The control section 76 temporarily stores (step S6) the resonant output voltage V733 detected by the voltage detection section 74 into the storage section not shown.

Then, the control section 76 resets (step S7) the basic frequency fo to the frequency fs of the control signal S. In the section of the control signal S with the basic frequency fo, the control section 76 determines (step S8) whether or not the resonant output voltage V733 thus detected is equal to or higher than the resonant output voltage V733 detected previously. Here, since the resonant output voltage V733 is the voltage obtained corresponding to the first drive frequency fd, no previous value exists. In this case, the control section 76 determines that it is equal to or higher than the resonant output voltage V733 detected previously (YES in the step S8). The determination process is for figuring out whether or not the frequency fs of the control signal S exceeds the resonant frequency fsr shown in FIG. 3. If the resonant output voltage V733 thus detected is lower than the previous one (NO in the step S8), the control section 76 stores (step S9) the previous drive frequency, here the frequency fd, into the storage section of the control section 76 as the resonant frequency.

Further, in the case in which the discharge lamp 10 does not light in the step S11 (NO in the step S11), and in the case in which the specified operation time period has elapsed in the step S13 (YES in the step S13), the control section 76 outputs a lamp failure-in-lighting error to the system control section of the projector device 1, and then, the user is notified of the fact that the lamp failure-in-lighting error occurs via a display section or the like not shown under the control of the system control section. On this occasion, the system control section of the projector device 1 performs a predetermined process for resolving the error such as operating a fan for cooling the discharge lamp 10. Further, it becomes possible for the user receiving the notification to perform a response such as postponing the use of the projector device 1 for a certain period of time.

It should be noted that the basic frequency fo in the step S7 described above and the basic frequency fo in the step S10 are not required to be the same as each other, and can be different from each other providing the frequencies are lower than the resonant frequency, namely 50 kHz and 60 Hz, for example. Further, the specified operation time periods in the step S13 and the step S17 are not required to be the same specified operation time period, but can be different from each other.

Subsequently, the control section 76 sets (step S10) the basic frequency fo again to the frequency fs of the control signal S. In the section of the control signal S with the basic frequency fo, the control section 76 determines (step S11) whether or not the discharge lamp 10 starts lighting based on the detection result of the lighting detection section 75. Here, if it is determined that the discharge lamp 10 does not light (No in the step S11), the control section 76 measures (step S12) the operation time period having elapsed from the start of the lighting operation, and then determines (step S13) whether or not the specified operation time period has elapsed. Here, if the specified operation time period has not elapsed (NO in the step S13), the control section 76 drops the frequency fs of the control signal S and then sets (step S14) the drive frequency fc. Subsequently, the control section 76 returns the processing operation to the step S1 described above, and then repeatedly performs substantially the same steps until it is determined in the step S11 described above that the discharge lamp 10 starts lighting.

Here, if it is determined in the step S11 described above that the discharge lamp 10 starts lighting (YES in the step S11) in the case in which the clock frequency of the control signal S is set to the frequency fc in the step S14, the control section 76 sets (step S15) the frequency fs of the control signal S to the basic frequency fo, and then measures (step S16) the specified operation time period. Then, the control section 76 determines (step S17) whether or not the specified operation time period has elapsed. If the specified operation time period has not elapsed (NO in the step S17), the control section 76 repeats the steps S11 through S17 until the specified operation time period elapses. If the specified operation time period has elapsed (YES in the step S17), the control section 76 sets the predetermined frequency in the normal lighting state as the frequency fs of the control signal S, and then outputs (step S18) the normal lamp lighting signal waveform as the control signal S.

Further, in the case in which the discharge lamp 10 does not light in the step S11 (NO in the step S11), and in the case in which the specified operation time period has elapsed in the step S13 (YES in the step S13), the control section 76 outputs a lamp failure-in-lighting error to the system control section of the projector device 1, and then, the user is notified of the fact that the lamp failure-in-lighting error occurs via a display section or the like not shown under the control of the system control section. On this occasion, the system control section of the projector device 1 performs a predetermined process for resolving the error such as operating the fan for cooling the discharge lamp 10. Further, it becomes possible for the user receiving the notification to perform a response such as postponing the use of the projector device 1 for a certain period of time.

It should be noted that although it is assumed in the embodiment described above that the discharge lamp lighting device 70 is a constituent of the projector device 1, it is also possible to configure the discharge lamp lighting device 70 as a separate device from the projector device 1.

Further, it is also possible to express the operation procedure of the discharge lamp lighting device 70 according to the embodiment described above as a discharge lamp lighting method. The discharge lamp lighting method can be expressed as a method including a step of converting the direct-current power into the alternating-current power by the power conversion section 72, and then supplying the discharge lamp 10 with the alternating-current power via the resonant circuit section 73, and a step of changing the frequency fs of the alternating-current power described above by the control section 76 in a stepwise manner with the basic frequency fo, which is different from the frequency fr causing the resonance of the resonant circuit section 73, intervening therebetween in the lighting start period until the discharge lamp 10 reaches the stationary lighting state.

Although the embodiment of the invention is hereinabove explained, the invention is not limited to the embodiment described above, but can variously be modified within the scope or the spirit of the invention.

For example, although in the embodiment described above the power conversion section 72 is configured using the full-bridge circuit, it is also possible to use an arbitrary circuit configuration such as a half-bridge as the circuit configuration of the power conversion section 72 providing the alternating-current power can be supplied to the resonant circuit section 73.

Further, the circuit configurations of the voltage detection section 74 and the lighting detection section 75 are not limited to the embodiment described above, but arbitrary circuit configurations can be used.

Second Embodiment

Hereinafter, a second embodiment out of some aspects of embodying the invention will be explained in detail with reference to the accompanying drawings.

In comparison between a discharge lamp lighting device 70a according to the present embodiment and the discharge lamp lighting device 70 according to the first embodiment, there is a difference in the point that a current detection section 74a, a lighting detection section 75a, and a control section 76a are provided instead of the voltage detection section 74, the lighting detection section 75, and the control section 76. The functional configuration is substantially the same except the point, and therefore, the explanation therefor will be omitted.

Figure 6:
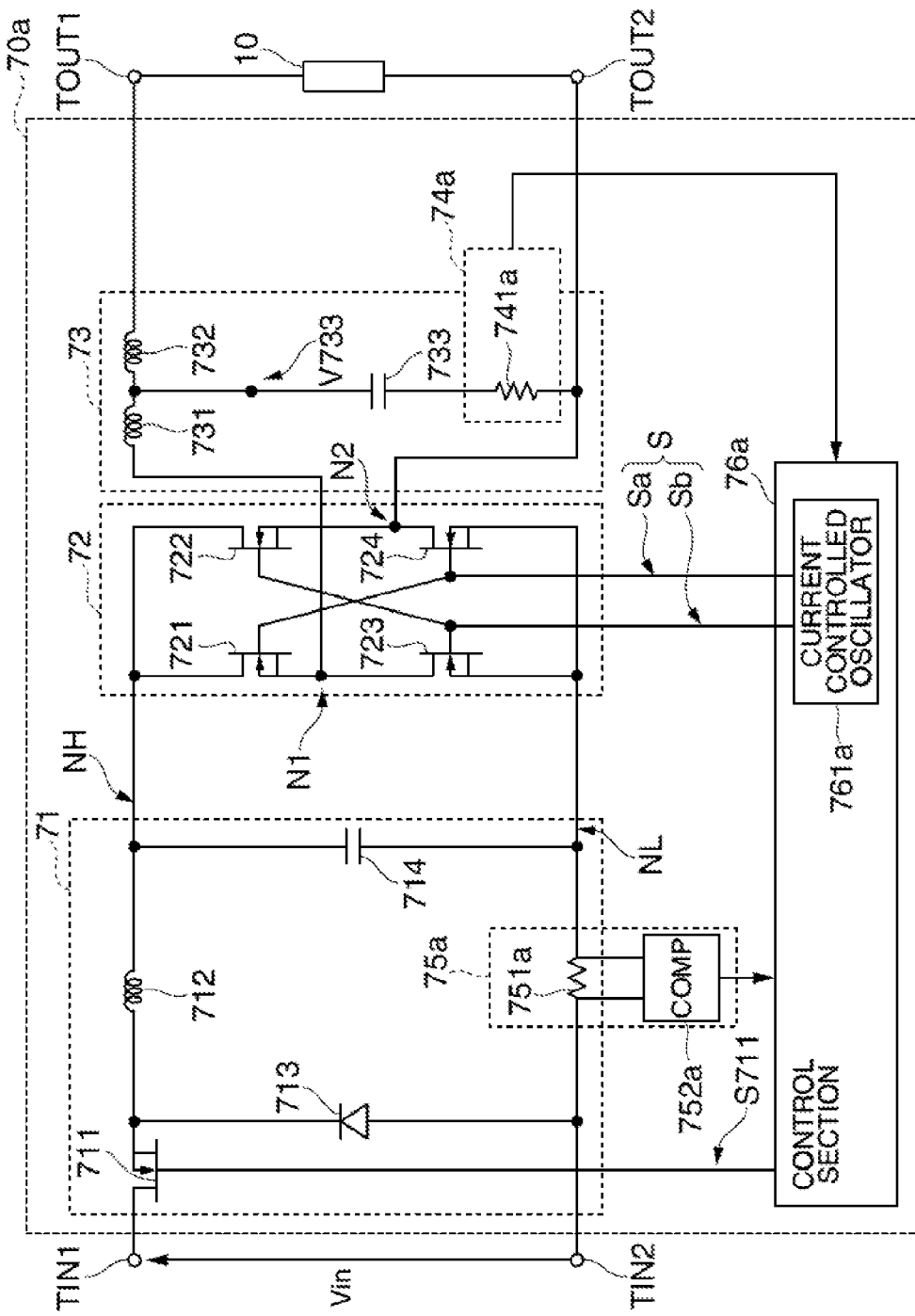
FIG. 6 is a block diagram showing an example of a functional configuration of a discharge lamp lighting device provided to a projector device according to a second embodiment of the invention.

FIG. 6 shows an example of the functional configuration of the discharge lamp lighting device 70a. The discharge lamp lighting device 70a is configured including the down chopper section 71, the power conversion section 72, the resonant circuit section 73, the current detection section 74a, the lighting detection section 75a, and the control section 76a.

The current detection section 74a is for detecting a current I733 flowing through the capacitor 733 constituting the resonant circuit section 73 described above, and is formed of a resistor 741a connected in series to one end of the capacitor 733. Here, the resistor 741a is for obtaining the current I733 flowing through the capacitor 733 of the resonant circuit section 73 based on the potential difference thereof. In the present embodiment, the current I733 flowing through the capacitor 733 is referred to as a "resonant output current I733." The current detection section 74a performs the analog/digital conversion on the resonant output current I733, the digital data represents the value of the resonant output current I733, and the resonant output current I733 detected by the current detection section 74a is supplied to the control section 76a. It should be noted that the current detection section 74a always monitors the resonant output current I733, and if an abnormal current such as an excessive current is detected, the current detection section 74a notifies the control section 76a of the resonant output current I733 thus detected, and the control section 76a stops the control on the ground of an error.

It should be noted that although in the present embodiment the resonant output current I733 is detected using the resistor 741a, it is also possible to detect the resonant output current I733 using a resistor 751a of the lighting detection section 75a described later. In this case, the current detection section 74a becomes unnecessary, and the circuit can be downsized.

The lighting detection section 75a is for detecting lighting/failure-in-lighting of the discharge lamp 10, and is composed of the resistor 751a and a comparator section 752a. Here, the resistor 751a is connected between a connection node of the input terminal TIN2 and the diode 713 of the down chopper section 71, and a connection node of the capacitor 714 of the down chopper section 71 and the sources of the respective n-channel field effect transistors 723, 724 constituting the power conversion section 72, and the inter-terminal voltage (a drop voltage) of the resistor 751a is input to the comparator section 752a. The comparator section 752a detects the current flowing through the discharge lamp 10 based on the inter-terminal voltage of the resistor 751a, and by comparing the current thus detected and the current, which flows through the resistor 751a when the discharge lamp 10 starts lighting, with each other, lighting/failure-in-lighting of the discharge lamp 10 is detected. Specifically, the lighting detection section 75a detects lighting of the discharge lamp 10 if, for example, the inter-terminal current of the resistor 751a is equal to or higher than a predetermined current value, and detects failure-in-lighting of the discharge lamp 10 if the inter-terminal current of the resistor 751a falls below the predetermined current value. When detecting lighting of the discharge lamp, the lighting detection section 75a outputs a signal representing the detection of lighting of the discharge lamp to the control section 76a.

Although the current value is input to the control section 76a instead of the voltage value, the control section 76a performs substantially the same operation as that of the control section 76 in the first embodiment. The control section 76a is provided with a current controlled oscillator 761a. The current controlled oscillator 761a is for outputting the signal with the frequency corresponding to the input current (not shown) as the control signal S. The signal defining the input current of the current controlled oscillator 761a is generated in the control section 76a so that the switching operation described later of the power conversion section 72 can be obtained.

Figure 7:
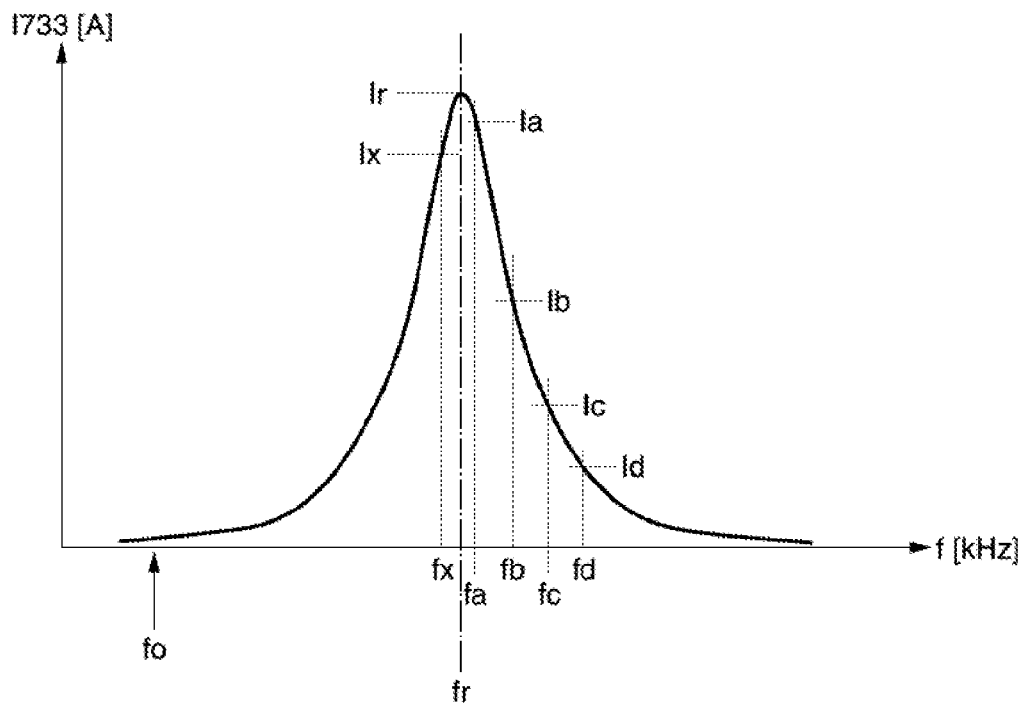
FIG. 7 is an explanatory diagram for explaining an overall operation of the discharge lamp lighting device provided to the projector device according to the embodiment.

FIG. 7 is an explanatory diagram for explaining an overall operation of the discharge lamp lighting device 70a provided to the projector device 1a according to the present embodiment.

FIG. 7 is the explanatory diagram of the case in which the current detection section 74a performs the resonant output current detection instead of the voltage detection section 74 detecting the resonant output voltage in FIG. 3, and therefore, the explanation therefor will be omitted.

Figure 8:
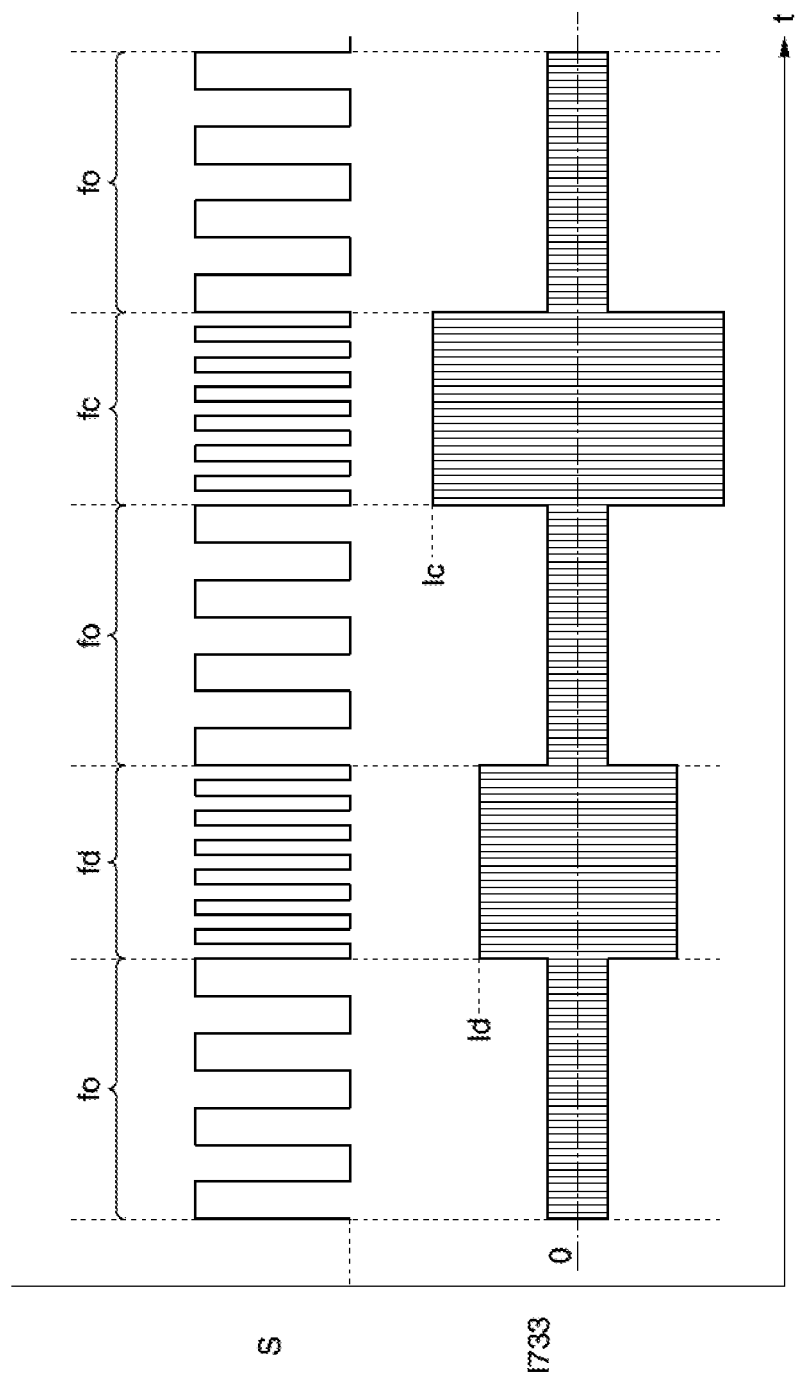
FIG. 8 is a waveform chart for supplementarily explaining an overall operation of the discharge lamp lighting device provided to the projector device according to the embodiment.

FIG. 8 is a waveform chart for supplementarily explaining an overall operation of the discharge lamp lighting device 70a provided to the projector device 1a according to the present embodiment.

As shown in the upper part of FIG. 8, the control signal S alternately includes the basic frequency fo described above and the drive frequencies (fc, fd) decreasing in a stepwise manner. In this example, the frequency fs of the control signal S is first set to the basic frequency fo, then set to the drive frequency fd, then set to the basic frequency fo again, and then set to the drive frequency fc. Further, as shown in the lower part of the drawing, the amplitude of the resonant output current I733 corresponding to the basic frequency fo of the control signal S is decreased, and the amplitude of the resonant output current I733 corresponding to the drive frequencies (fc, fd) decreasing in a stepwise manner is increased. The amplitude values Ic, Id of the resonant output current I733 on this occasion correspond to the currents Ic, Id at the respective drive frequencies fc, fd shown in FIG. 7 described above.

As described above, in the process of decreasing the frequency fs of the alternating-current power in a stepwise manner, if lighting of the discharge lamp 10 is not detected by the lighting detection section 75a, the control section 76a decreases the frequency fs of the alternating-current power in a stepwise manner with the basic frequency fo, which is different from the resonant frequency fsr of the resonant circuit section 73, intervening therebetween to thereby decrease the frequency fs of the alternating-current power until the lighting detection section 75a detects lighting. Then, if the lighting detection section 75a detects lighting of the discharge lamp 10, the control section 76a sets the frequency fs of the alternating-current power to the predetermined frequency of the stationary lighting state. Specifically, after the discharge of the discharge lamp 10 starts, the frequency fs of the alternating-current power is decreased to the predetermined frequency of the stationary lighting state, and lighting (the discharge) of the discharge lamp 10 is maintained.

Further, in the process of decreasing the frequency fs of the alternating-current power in a stepwise manner described above, if the frequency fs of the alternating-current power falls below the resonant frequency fsr while the discharge lamp 10 fails to light, and the resonant output current I733 detected by the current detection section 74a exceeds the peak current Ir shown in FIG. 7, and the change in the resonant output current I733 is switched from increase to decrease, the control section 76a resets the frequency fs of the alternating-current power to the drive frequency to which the frequency fs is set in the previous stage. Thus, it is possible to set the frequency fs of the alternating-current power to the drive frequency adjacent to the frequency at which the resonant output current I733 becomes the highest, namely the resonant frequency fsr having the highest possibility of starting the discharge in the process of decreasing the frequency fs of the alternating-current power in a stepwise manner, and the control section 76a waits for the start of the discharge of the discharge lamp 10 in this setting state. It should be noted that if the discharge lamp 10 does not start the discharge even if a specified time has elapsed, an error is output to the system control section of the projector device 1a as described later.

Figure 9:
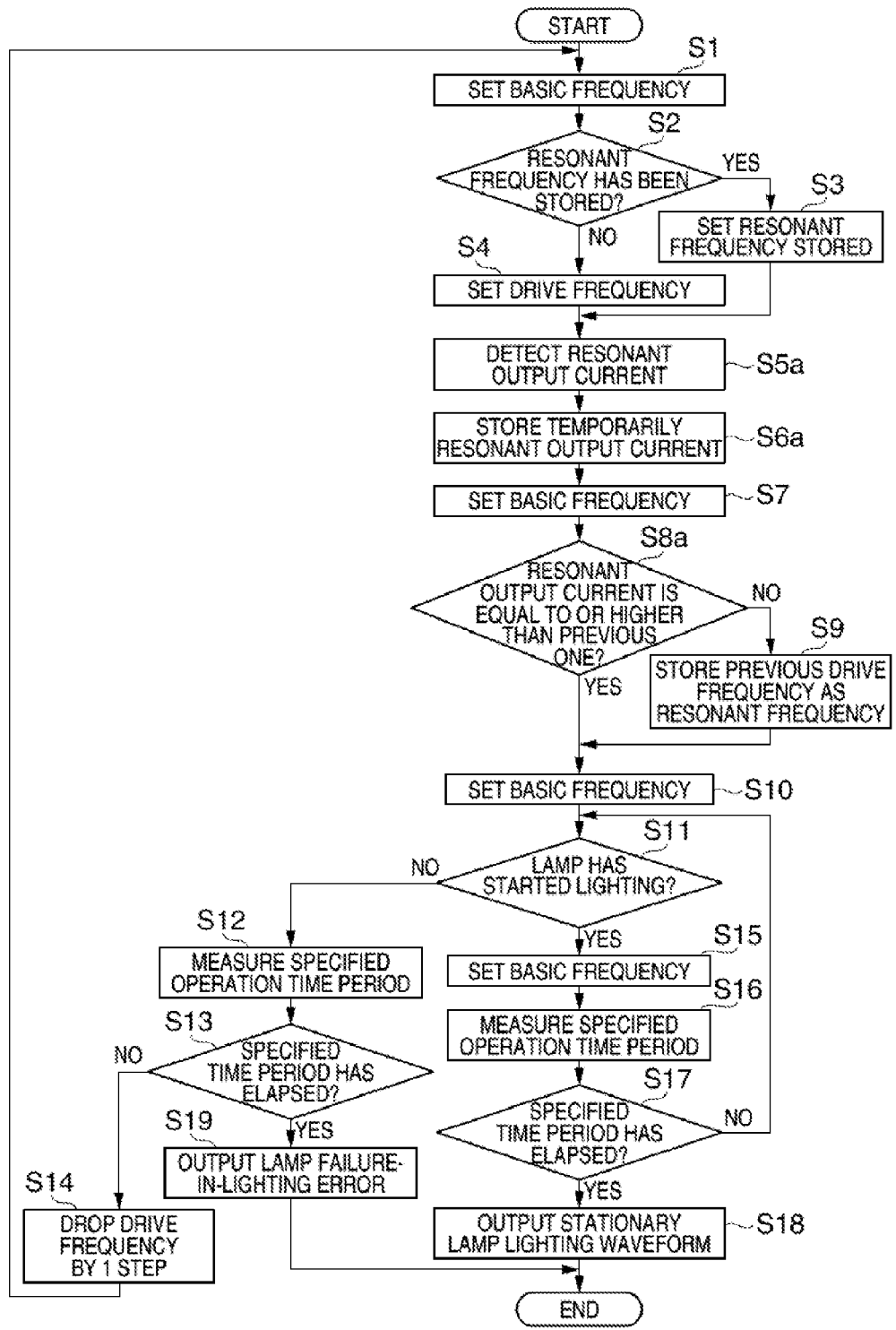
FIG. 9 is a flowchart showing an example of a flow of the operation of the projector device according to the embodiment.

FIG. 9 is a flowchart showing an example of a flow of the operation of the projector device 1a according to the present embodiment. FIG. 9 is sufficiently described by reading "voltage" in the flowchart representing the example of the flow of the operation of the projector device 1 shown in FIG. 5 with "current," and therefore, the explanation therefor will be omitted.

As described above, according to the present embodiment, substantially the same advantages as in the first embodiment can be obtained.

Third Embodiment

Hereinafter, a third embodiment out of some aspects of embodying the invention will be explained in detail with reference to the accompanying drawings.

In comparison between the discharge lamp lighting device 70a according to the present embodiment and the discharge lamp lighting device 70a according to the second embodiment, the functional configuration is substantially the same, and therefore, the explanation therefor will be omitted. It should be noted that the setting method of the drive frequency is different, and will therefore be explained.

Figure 11:
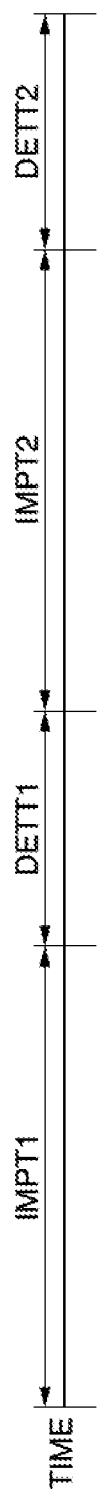
FIG. 11 is a diagram showing an example of transition of drive frequency setting time periods and lighting detection time periods according to a third embodiment of the invention.

FIG. 11 is a diagram showing an example of transition of drive frequency setting time periods IMPT1, IMPT2 and lighting detection time periods DETT1, DETT2 according to the present embodiment.

The control section 76a performs the detection of the drive frequency adjacent to the resonant frequency fsr in the drive frequency setting time periods IMPT1, IMPT2. Since the drive frequency setting time periods IMPT1, IMPT2 are the time periods for performing substantially the same processes, and are therefore collectively referred to as the drive frequency setting time period IMPT in the following explanation. The drive frequency setting time period IMPT is, for example, 1000 ms. The control section 76a applies the frequency detected in the drive frequency setting time period IMPT to the discharge lamp 10. The detailed setting method of the drive frequency in the vicinity of the resonant frequency fsr will be described later. Since the lighting detection time periods DETT1, DETT2 are the time periods for performing substantially the same processes, and are therefore collectively referred to as the lighting detection time period DETT in the following explanation. The lighting detection section 75a detects whether or not the discharge lamp 10 is in the lighting state in the lighting detection time period DETT. The lighting detection time period DETT is, for example, 500 ms. It should be noted that if the lighting detection section 75a detects the fact that the discharge lamp 10 is in the lighting state in the lighting detection time period DETT1, it is not required to perform the detection of the drive frequency in the vicinity of the resonant frequency fsr in the drive frequency setting time period IMPT2 by the control section 76a, and the detection of whether or not the discharge lamp 10 is in the lighting state in the lighting detection time period DETT2 by the lighting detection section 75a.

Figure 12:
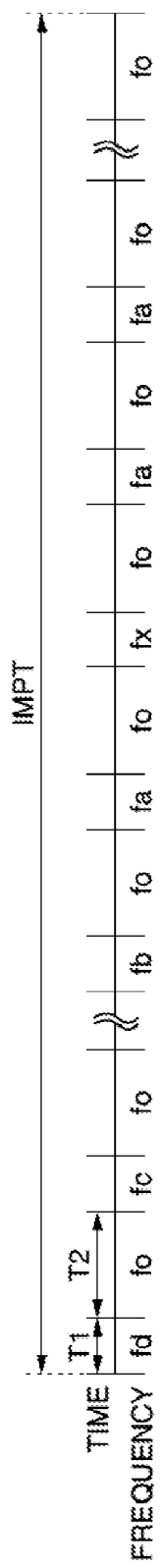
FIG. 12 is a diagram showing an example of transition of the drive frequency in the drive frequency setting time period according to the embodiment.

FIG. 12 is a diagram showing an example of the transition of the drive frequency in the drive frequency setting time period IMPT according to the present embodiment. The explanation will be presented using the resonant characteristics of the resonant output current I733 shown in FIG. 7. The control section 76a changes the frequency fs of the alternating-current power supplied from the power conversion section 72 in a descending direction from the drive frequency fd toward the resonant frequency fsr in a stepwise manner in the order of the drive frequencies fc, fb, fa, and fx with the predetermined basic frequency fo, which is different from the resonant frequency fsr, intervening therebetween. On this occasion, the control section 76a monitors the resonant output current I733, and identifies the drive frequency adjacent to the resonant frequency fsr based on the resonant output current I733 during the period of supplying the alternating-current power with each of the drive frequencies.

Specifically, the control section 76a firstly applies the predetermined drive frequency fd sufficiently higher than the resonant frequency fsr for a predetermined time period T1, namely until 2 ms is reached, for example. Subsequently, the control section 76a applies the basic frequency fo for a predetermined time period T2, namely until 6 ms is reached, for example. Subsequently, the control section 76a applies the drive frequency fc, which is the drive frequency obtained by decreasing the drive frequency fd toward the resonant frequency fsr, until the predetermined time period T1 is reached. Subsequently, the control section 76a applies the basic frequency fo again until the predetermined time period T2 is reached. In such a manner as described above, the control section 76a identifies the drive frequency, at which the resonant output current I733 corresponding to each of the drive frequencies except the basic frequency fo takes the maximum value, as the drive frequency adjacent to the resonant frequency fsr. The control section 76a repeats the application of the drive frequency adjacent to the resonant frequency fsr thus detected and the application of the basic frequency fo until the drive frequency setting time period IMPT shown in FIG. 12 ends. The control section 76a alternately applies the predetermined frequency (the drive frequency) higher than the basic frequency fo and the frequency (the basic frequency fo) lower than the drive frequency to thereby make the current easy to flow through the circuit, and in the case in which the discharge lamp 10 starts lighting at the predetermined frequency (the resonant frequency) higher than the basic frequency fo, the lighting state can be made brighter.

The control section 76a applies the basic frequency fo in the lighting detection time period DETT. During the period, the lighting detection section 75a detects whether or not the discharge lamp 10 is in the lighting state. If the lighting detection section 75a fails to detect the lighting state of the discharge lamp 10, the control section 76a performs substantially the same process as in the drive frequency setting time period IMPT1 again in the drive frequency setting time period IMPT2. Subsequently, the control section 76a applies the basic frequency fo in the lighting detection time period DETT2. On this occasion, the lighting detection section 75a detects again whether or not the discharge lamp 10 is in the lighting state. If the lighting state of the discharge lamp 10 is not detected by the lighting detection section 75a, the control section 76a gives notice of an error.

It should be noted that the predetermined time period T1 for applying the basic frequency fo and the predetermined time period T2 for applying the drive frequency are different from each other in the drive frequency setting time period IMPT, and it is preferable that the predetermined time period T1 for applying the basic frequency fo is set to be longer than the predetermined time period T2 for applying the drive frequency. Further, it is also possible to change the drive frequency with a frequency step corresponding to the detection value of the resonant output current I733 looking up the table Ta1 shown in FIG. 10 when changing the drive frequency toward the resonant frequency fsr. Specifically, the table Ta1 includes item columns of the current value and the skip count, and the skip count, namely the number of steps of a certain frequency, is made to correspond to each of the current values. If the current value is Id, the skip count is 5, and if the current value is Ic, the skip count is 4. Further, it is also possible for the control section 76a to determine the skip count using the peak value Ir of the resonant output current I733 stored in advance in the storage section, and a threshold value corresponding to the peak value Ir. In this case, if the current value comes closer to the peak value Ir of the resonant output current I733, namely the current value is equal to or higher than the threshold value, the control section 76a decreases the skip count, or changes the drive frequency in a step-by-step manner. Thus, the control section 76a can detect the resonant frequency faster than in the case of changing the drive frequency in a step-by-step manner.

Figure 13:
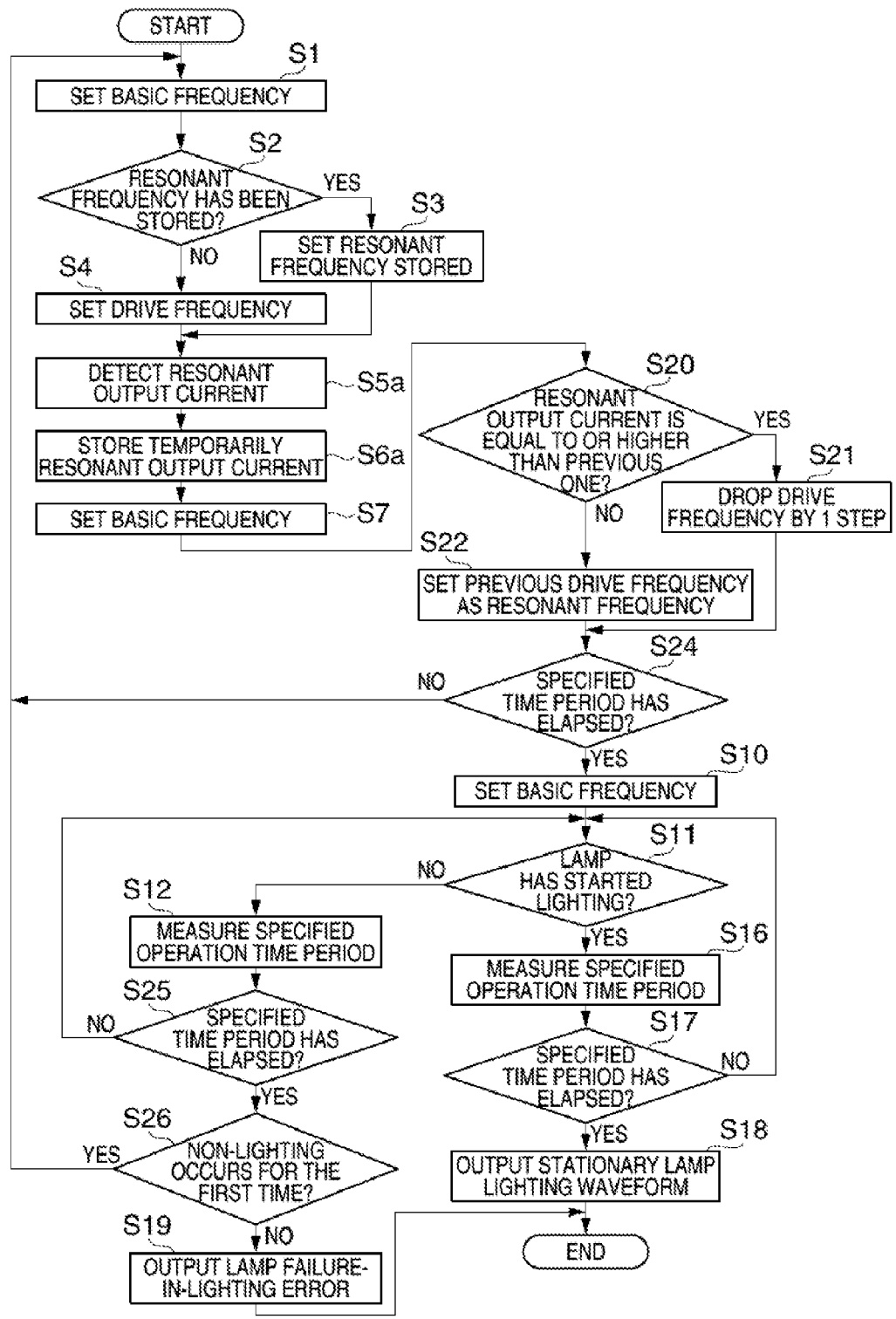
FIG. 13 is a flowchart showing an example of a flow of the operation of the projector device according to the embodiment.

FIG. 13 is a flowchart showing an example of a flow of the operation of the projector device according to the present embodiment.

Firstly, if an operation of a power switch (not shown) is performed by the user, the CPU 80 of the projector device 1 instructs the discharge lamp lighting device 70a to light the discharge lamp 10.

When receiving the instruction described above, the control section 76a of the discharge lamp lighting device 70a starts the switching operation of the down chopper section 71 with the control signal S711, and at the same time, sets (step S1) the basic frequency fo described above as the frequency fs of the control signal S, and then starts the switching operation of the power conversion section 72 with the control signal S.

Subsequently, the control section 76a determines (step S2) whether or not the resonant frequency fsr (the frequency fs of the alternating-current power applied to the resonant circuit section 73 corresponding to the resonant frequency fr, namely the frequency of the signal S) described above is stored in a storage section not shown provided to the control section 76a. Here, in the present embodiment, if the lighting operation has ever been performed in the past, the drive frequency at which the discharge of the discharge lamp 10 has started in the past lighting operation is stored in the storage section as the resonant frequency fsr. If the resonant frequency fsr is stored in the storage section (YES in the step S2), the control section 76a sets (step S3) the drive frequency in accordance with the resonant frequency fsr thus stored. Here, it is assumed that the lighting operation has not ever been performed in the past, and the resonant frequency fsr of the past lighting operation is not stored in the storage section not shown provided to the control section 76a (NO in the step S2).

If the resonant frequency fsr of the past lighting operation is not stored in the storage section (NO in the step S2), the control section 76a sets (step S4) the predetermined drive frequency fd as the frequency fs of the control signal S. The power conversion section 72 performs the switching operation based on the control signal S having the drive frequency fd, and supplies the resonant circuit section 73 with the alternating-current power having the drive frequency fd for the predetermined time period T1. In the predetermined time period T1, the current detection section 74a detects the resonant output current I733 (step S5a). The control section 76a temporarily stores (step S6a) the resonant output current I733 detected by the current detection section 74a into the storage section not shown.

Then, the control section 76a resets (step S7) the basic frequency fo to the frequency fs of the control signal S, and then the power conversion section 72 supplies the resonant circuit section 73 with the alternating-current power having the basic frequency fo for the predetermined time period T2 in accordance with the setting. The control section 76a determines (step S20) whether or not the resonant output current I733 temporarily stored in the step S6a is equal to or higher than the resonant output current I733 temporarily stored at the last time (in the step S6a at the previous time). If it is determined that the resonant output current I733 temporarily stored in the step S6a is equal to or higher than the resonant output current I733 detected at the last time (YES in the step S20), the control section 76a drops the drive frequency by one step (step S21). It should be noted that the resonant output current I733 is the current obtained corresponding to the first drive frequency fd, and if the last value does not exist, the control section 76a determines that the resonant output current is equal to or higher than the resonant output current I733 temporarily stored at the last time (YES in the step S20). The determination process is for figuring out whether or not the frequency fs exceeds the resonant frequency fsr. If the resonant output current I733 is lower than the resonant output current I733 temporarily stored at the last time (NO in the step S20), the control section 76a sets (step S22) the drive frequency at the last time (at the previous time) as the resonant frequency.

Subsequently, the control section 76a determines (step S24) whether or not the specified time has elapsed, namely whether or not the drive frequency setting time period IMPT ends. If the specified time has not elapsed (NO in the step S24), the process returns to the step S1. On the other hand, if the specified time has elapsed (YES in the step S24), the control section 76a sets (step S10) the basic frequency fo again as the frequency fs. The control section 76a determines (step S11) whether or not the discharge lamp 10 starts lighting based on the detection result of the lighting detection section 75a. Here, if it is determined that the discharge lamp 10 does not light (No in the step S11), the control section 76a measures (step S12) the operation time period having elapsed from the start of the lighting detection, and then determines (step S25) whether or not the specified operation time period has elapsed, namely whether or not the lighting detection time period DETT has ended. Here, if the specified operation time period has not elapsed (NO in the step S25), the control section 76a returns to the step S11.

Here, if it is determined in the step S11 that the discharge lamp 10 has started lighting (YES in the step S11), the control section 76a measures (step S16) the specified operation time period. Then, the control section 76a determines (step S17) whether or not the specified operation time period has elapsed, namely whether or not the lighting detection time period DETT has ended. If the specified operation time period has not elapsed (NO in the step S17), the process returns to the step S11. If the specified operation time period has elapsed (YES in the step S17), the control section 76a sets the predetermined frequency in the normal lighting state as the frequency fs, and then sets (step S18) the control signal S to the normal lamp lighting signal.

Further, in the case in which the discharge lamp 10 does not light in the step S11 described above (NO in the step S11), and the specified operation time period has elapsed in the step S25 described above (YES in the step S25), the control section 76a determines (step S26) whether or not the number of times of elapse of the specified time with the discharge lamp 10 kept in the non-lighting state is one. If the number is one (YES in the step S26), the process returns to the step S1. On the other hand, if the number is not one (NO in the step S26), the control section 76a outputs (step S19) a failure-in-lighting error of the discharge lamp 10 to the system control section of the projector device 1, and then, the user is notified of the fact that the lamp failure-in-lighting error occurs via a display section or the like not shown under the control of the system control section. On this occasion, the system control section of the projector device 1 performs a predetermined process for resolving the error such as operating the fan for cooling the discharge lamp 10. Further, it becomes possible for the user receiving the notification to perform a response such as postponing the use of the projector device 1 for a certain period of time.

It should be noted that the basic frequency fo in the step S7 described above, the basic frequency fo in the step S10, and the basic frequency fo in the step S15 are not required to be the same as each other, and can be different from each other providing the frequencies are lower than the resonant frequency and different from the resonant frequency, such as 50 kHz, 60 kHz, and 70 kHz, respectively. Further, the specified operation time periods in the step S25 and the step S17 are not required to be the same specified operation time period, but can be different from each other. Further, if the discharge lamp 10 is in the lighting state in the step S11 described above, it is also possible to perform the step S18 as a subsequent operation. Further, although the resonant output current is detected using the current detection section 74a to thereby determine the drive frequency in the present embodiment, it is also possible to detect the resonant output voltage using the voltage detection section 74 instead of the current detection section 74a to thereby determine the drive frequency.

It should be noted that although it is assumed in the embodiment described above that the discharge lamp lighting device 70a is a constituent of the projector device 1, it is also possible to configure the discharge lamp lighting device 70a as a separate device from the projector device 1.

Further, it is also possible to express the operation procedure of the discharge lamp lighting device 70a according to the embodiment described above as a discharge lamp lighting method. The discharge lamp lighting method can be expressed as a method including a step of converting the direct-current power into the alternating-current power by the power conversion section 72, and then supplying the discharge lamp 10 with the alternating-current power via the resonant circuit section 73, and a step of changing the frequency fs of the alternating-current power described above by the control section 76a in a stepwise manner with the basic frequency fo, which is different from the frequency fr causing the resonance of the resonant circuit section 73, intervening therebetween in the lighting start period until the discharge lamp 10 reaches the stationary lighting state.

Although the embodiments of the invention are hereinabove explained, the invention is not limited to the embodiments described above, but can variously be modified within the scope or the spirit of the invention.

For example, although in the embodiment described above the power conversion section 72 is configured using the full-bridge circuit, it is also possible to use an arbitrary circuit configuration such as a half-bridge as the circuit configuration of the power conversion section 72 providing the alternating-current power can be supplied to the resonant circuit section 73.

Further, the circuit configurations of the current detection section 74a and the lighting detection section 75a are not limited to the embodiments described above, but arbitrary circuit configurations can be used.

The entire disclosure of Japanese Patent Application Nos. 2012-64501, filed Mar. 21, 2012 and 2012-272206, filed Dec. 13, 2012 are expressly incorporated by reference herein.

What is claimed is:

1. A discharge lamp lighting device comprising:
   a resonant circuit section connected to a discharge lamp;
   a power conversion section adapted to convert direct-current power into alternating-current power and supply the discharge lamp with the alternating-current power via the resonant circuit section;
   a control section adapted to change a frequency of the alternating-current power in a stepwise manner with a frequency, which is different from a frequency causing a resonance of the resonant circuit section, intervening between frequency values of the frequency changed in a lighting start period until the discharge lamp reaches a stationary lighting state; and
   a lighting detection section adapted to detect lighting of the discharge lamp,
   wherein the control section changes the frequency of the alternating-current power in the stepwise manner with the frequency, which is different from the frequency causing the resonance of the resonant circuit section, intervening between the frequency values of the frequency changed if lighting of the discharge lamp fails to be detected by the lighting detection section.

2. The discharge lamp lighting device according to claim 1, wherein the control section changes the frequency of the alternating-current power in the stepwise manner in a descending direction toward the frequency causing the resonance of the resonant circuit section.

3. The discharge lamp lighting device according to claim 1, wherein
   the frequency different from the frequency causing the resonance of the resonant circuit section is a frequency lower than the frequency causing the resonance of the resonant circuit section.

4. The discharge lamp lighting device according to claim 1, wherein the control section sets the frequency of the alternating-current power to a predetermined frequency in the stationary lighting state if the lighting detection section detects lighting of the discharge lamp.

5. The discharge lamp lighting device according to claim 1, wherein
   the control section sets the frequency of the alternating-current power in a first time period so that the frequency of the alternating-current power changes in the stepwise manner with the frequency, which is different from the frequency causing the resonance of the resonant circuit section, intervening between frequency values of the frequency changing, and
   the lighting detection section detects lighting of the discharge lamp in a second time period after the first time period.

6. The discharge lamp lighting device according to claim 1, further comprising:
   a voltage detection section adapted to detect a resonant output voltage of the resonant circuit section,
   wherein if a change in the resonant voltage detected by the voltage detection section is switched from increase to decrease in a process of changing the frequency of the alternating-current power in the stepwise manner, the control section sets the frequency of the alternating-current power to the frequency in a previous step.

7. The discharge lamp lighting device according to claim 1, further comprising:
   a current detection section adapted to detect a resonant output current of the resonant circuit section,
   wherein if a change in the resonant current detected by the current detection section is switched from increase to decrease in a process of changing the frequency of the alternating-current power in the stepwise manner, the control section sets the frequency of the alternating-current power to the frequency in a previous step.

8. The discharge lamp lighting device according to claim 1, further comprising:
   a detection section adapted to detect one of a resonant output current and a resonant output voltage of the resonant circuit section,
   wherein if a change in one of the resonant current and the resonant voltage detected by the detection section is switched from increase to decrease in a first time period in a process of changing the frequency of the alternating-current power in the stepwise manner, the control section sets the frequency of the alternating-current power to the frequency in a previous step, and the lighting detection section detects lighting of the discharge lamp in a second time period after the first time period.

9. The discharge lamp lighting device according to claim 8, wherein
   in the first time period, the control section applies the frequency in the previous step set as the frequency of the alternating-current power a predetermined number of times before the first time period ends.

10. The discharge lamp lighting device according to claim 1, wherein
    alternating-current power with a frequency 1/N (N denotes an integer) of the frequency of the alternating-current power is applied to the resonant circuit section.

11. A discharge lamp lighting device adapted to supply a discharge lamp with alternating-current power via a resonant circuit section to thereby start discharge of the discharge lamp to light the discharge lamp, the discharge lamp lighting device comprising:
    a control section adapted to change a frequency of the alternating-current power in a stepwise manner with a frequency, which is different from a frequency causing a resonance of the resonant circuit section, intervening between frequency values of the frequency changed in a lighting start period until the discharge lamp reaches a stationary lighting state; and
    a lighting detection section adapted to detect lighting of the discharge lamp,
    wherein the control section changes the frequency of the alternating-current power in the stepwise manner with the frequency, which is different from the frequency causing the resonance of the resonant circuit section, intervening between the frequency values of the frequency changed if lighting of the discharge lamp fails to be detected by the lighting detection section.

12. The discharge lamp lighting device according to claim 1, wherein the frequency different from the frequency causing the resonance of the resonant circuit section is lower than the frequency causing the resonance of the resonant circuit section, and higher than a frequency at which a current supplied from the power conversion section adapted to supply the alternating-current power is one of equal to and lower than a predetermined value.

13. The discharge lamp lighting device according to claim 11, wherein
    the frequency different from the frequency causing the resonance of the resonant circuit section is lower than the frequency causing the resonance of the resonant circuit section, and higher than a frequency at which a current supplied from a power conversion section adapted to supply the alternating-current power is one of equal to and lower than a predetermined value.

14. A discharge lamp lighting method comprising:
    converting, by a power conversion section, direct-current power into alternating-current power and supplying a discharge lamp with the alternating-current power via a resonant circuit section;
    changing, by a control section, a frequency of the alternating-current power in a stepwise manner with a frequency, which is different from a frequency causing a resonance of the resonant circuit section, intervening between frequency values of the frequency changed in a lighting start period until the discharge lamp reaches a stationary lighting state; and
    detecting, by a lighting detection section, the lighting of the discharge lamp,
    wherein the control section changes the frequency of the alternating-current power in the stepwise manner with the frequency, which is different from the frequency causing the resonance of the resonant circuit section, intervening between the frequency values of the frequency changed if lighting of the discharge lamp fails to be detected by the lighting detection section.

15. A projector device comprising:
    the discharge lamp as a light source; and
    the discharge lamp lighting device according to claim 1 as a device adapted to light the discharge lamp.

16. A projector device comprising:
    the discharge lamp as a light source; and
    the discharge lamp lighting device according to claim 11 as a device adapted to light the discharge lamp.

17. A discharge lamp lighting device comprising:
    a resonant circuit section connected to a discharge lamp;
    a power conversion section adapted to convert direct-current power into alternating-current power and supply the discharge lamp with the alternating-current power via the resonant circuit section;
    a control section adapted to change a frequency of the alternating-current power in a stepwise manner with a frequency, which is different from a frequency causing a resonance of the resonant circuit section, intervening between frequency values of the frequency changed in a lighting start period until the discharge lamp reaches a stationary lighting state; and
    a voltage detection section adapted to detect a resonant output voltage of the resonant circuit section,
    wherein if a change in the resonant voltage detected by the voltage detection section is switched from increase to decrease in a process of changing the frequency of the alternating-current power in the stepwise manner, the control section sets the frequency of the alternating-current power to the frequency in a previous step.

18. A discharge lamp lighting device comprising:
    a resonant circuit section connected to a discharge lamp;
    a power conversion section adapted to convert direct-current power into alternating-current power and supply the discharge lamp with the alternating-current power via the resonant circuit section;
    a control section adapted to change a frequency of the alternating-current power in a stepwise manner with a frequency, which is different from a frequency causing a resonance of the resonant circuit section, intervening between frequency values of the frequency changed in a lighting start period until the discharge lamp reaches a stationary lighting state; and
    a current detection section adapted to detect a resonant output current of the resonant circuit section,
    wherein if a change in the resonant current detected by the current detection section is switched from increase to decrease in a process of changing the frequency of the alternating-current power in the stepwise manner, the control section sets the frequency of the alternating-current power to the frequency in a previous step.

19. A discharge lamp lighting device comprising:
a resonant circuit section connected to a discharge lamp;
a power conversion section adapted to convert direct-current power into alternating-current power and supply the discharge lamp with the alternating-current power via the resonant circuit section;
a control section adapted to change a frequency of the alternating-current power in a stepwise manner with a frequency, which is different from a frequency causing a resonance of the resonant circuit section, intervening between frequency values of the frequency changed in a lighting start period until the discharge lamp reaches a stationary lighting state;
a detection section adapted to detect one of a resonant output current and a resonant output voltage of the resonant circuit section; and
a lighting detection section adapted to detect lighting of the discharge lamp,
wherein if a change in one of the resonant current and the resonant voltage detected by the detection section is switched from increase to decrease in a first time period in a process of changing the frequency of the alternating-current power in the stepwise manner, the control section sets the frequency of the alternating-current power to the frequency in a previous step, and the lighting detection section detects lighting of the discharge lamp in a second time period after the first time period.

20. A discharge lamp lighting device comprising:
a resonant circuit section connected to a discharge lamp;
a power conversion section adapted to convert direct-current power into alternating-current power and supply the discharge lamp with the alternating-current power via the resonant circuit section;
a control section adapted to change a frequency of the alternating-current power in a stepwise manner with a frequency, which is different from a frequency causing a resonance of the resonant circuit section, intervening between frequency values of the frequency changed in a lighting start period until the discharge lamp reaches a stationary lighting state,
wherein the frequency different from the frequency causing the resonance of the resonant circuit section is lower than the frequency causing the resonance of the resonant circuit section, and higher than a frequency at which a current supplied from a power conversion section adapted to supply the alternating-current power is one of equal to and lower than a predetermined value.

21. A discharge lamp lighting device adapted to supply a discharge lamp with alternating-current power via a resonant circuit section to thereby start discharge of the discharge lamp to light the discharge lamp, the discharge lamp lighting device comprising:
a control section adapted to change a frequency of the alternating-current power in a stepwise manner with a frequency, which is different from a frequency causing a resonance of the resonant circuit section, intervening between frequency values of the frequency changed in a lighting start period until the discharge lamp reaches a stationary lighting state,
wherein the frequency different from the frequency causing the resonance of the resonant circuit section is lower than the frequency causing the resonance of the resonant circuit section, and higher than a frequency at which a current supplied from a power conversion section adapted to supply the alternating-current power is one of equal to and lower than a predetermined value.

\* \* \* \* \*